United States Patent
Sato

(10) Patent No.: US 9,521,401 B2
(45) Date of Patent: Dec. 13, 2016

(54) VIDEO DISPLAY APPARATUS

(71) Applicant: JVC KENWOOD Corporation, Kanagawa-ku, Yokohama-shi (JP)

(72) Inventor: Akihiro Sato, Yokosuka (JP)

(73) Assignee: JVC KENWOOD Corporation, Kanagawa (JP)

(*) Notice: Subject to any disclaimer, the term of this patent is extended or adjusted under 35 U.S.C. 154(b) by 494 days.

(21) Appl. No.: 13/966,351

(22) Filed: Aug. 14, 2013

(65) Prior Publication Data

US 2014/0078267 A1 Mar. 20, 2014

(30) Foreign Application Priority Data

Sep. 18, 2012 (JP) ................................. 2012-204030

(51) Int. Cl.
| H04N 13/04 | (2006.01) |
| G09G 3/36 | (2006.01) |
| G09G 3/00 | (2006.01) |
| G09G 3/20 | (2006.01) |

(52) U.S. Cl.
CPC ............ *H04N 13/04* (2013.01); *G09G 3/2059* (2013.01); *G09G 3/3648* (2013.01); *H04N 13/0438* (2013.01); *G09G 3/003* (2013.01); *G09G 3/2022* (2013.01)

(58) Field of Classification Search
CPC .................................................... H04N 13/04
See application file for complete search history.

(56) References Cited

U.S. PATENT DOCUMENTS

| 2005/0162360 A1* | 7/2005 | Ishihara | G09G 3/2011 345/89 |
| 2008/0074445 A1* | 3/2008 | Ochi | G09G 3/2022 345/690 |
| 2009/0244108 A1* | 10/2009 | Park | G09G 3/2037 345/690 |
| 2009/0262148 A1* | 10/2009 | Kimura | G09G 3/2003 345/690 |
| 2010/0188393 A1* | 7/2010 | Seki | G09G 3/2025 345/213 |
| 2013/0241977 A1* | 9/2013 | Okamoto | G02B 27/26 345/691 |

FOREIGN PATENT DOCUMENTS

| JP | 2009-031523 | 2/2009 |
| JP | 2012-103357 | 5/2012 |

* cited by examiner

*Primary Examiner* — James Pontius
(74) *Attorney, Agent, or Firm* — Louis Woo

(57) ABSTRACT

Every frame regarding an input video signal is changed into a sequence of subframes. Subframe data is generated from the input video signal while first and second tables are alternately used. The first and second tables are designed so that a number of subframes assigned a pixel activated state increases each time a drive gradation related to the input video signal increases by 1. According to the first table, a subframe newly assigned the pixel activated state is one following the subframe or subframes which have already been assigned the pixel activated state when the drive gradation increases from an odd number to a next even number. According to the second table, a subframe newly assigned the pixel activated state is one preceding the pixel-activated-state subframe or subframes in that case. A display device is driven in response to the generated subframe data.

7 Claims, 14 Drawing Sheets

FIG. 14

DRIVE GRADATION TABLE A

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0  | 0 | 0 | 0 | 0 | 0 | 0 | 0 | 0 | 0 | 0 | 0 | 0 |
| 1  | 0 | 0 | 0 | 0 | 0 | 1 | 0 | 0 | 0 | 0 | 0 | 0 |
| 2  | 0 | 0 | 0 | 0 | 0 | 1 | 1 | 0 | 0 | 0 | 0 | 0 |
| 3  | 0 | 0 | 0 | 0 | 1 | 1 | 1 | 0 | 0 | 0 | 0 | 0 |
| 4  | 0 | 0 | 0 | 0 | 1 | 1 | 1 | 1 | 0 | 0 | 0 | 0 |
| 5  | 0 | 0 | 0 | 1 | 1 | 1 | 1 | 1 | 0 | 0 | 0 | 0 |
| 6  | 0 | 0 | 0 | 1 | 1 | 1 | 1 | 1 | 1 | 0 | 0 | 0 |
| 7  | 0 | 0 | 1 | 1 | 1 | 1 | 1 | 1 | 1 | 0 | 0 | 0 |
| 8  | 0 | 0 | 1 | 1 | 1 | 1 | 1 | 1 | 1 | 1 | 0 | 0 |
| 9  | 0 | 1 | 1 | 1 | 1 | 1 | 1 | 1 | 1 | 1 | 0 | 0 |
| 10 | 0 | 1 | 1 | 1 | 1 | 1 | 1 | 1 | 1 | 1 | 1 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

DRIVE GRADATION TABLE B

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0  | 0 | 0 | 0 | 0 | 0 | 0 | 0 | 0 | 0 | 0 | 0 | 0 |
| 1  | 0 | 0 | 0 | 0 | 0 | 0 | 1 | 0 | 0 | 0 | 0 | 0 |
| 2  | 0 | 0 | 0 | 0 | 0 | 1 | 1 | 0 | 0 | 0 | 0 | 0 |
| 3  | 0 | 0 | 0 | 0 | 0 | 1 | 1 | 1 | 0 | 0 | 0 | 0 |
| 4  | 0 | 0 | 0 | 0 | 1 | 1 | 1 | 1 | 0 | 0 | 0 | 0 |
| 5  | 0 | 0 | 0 | 0 | 1 | 1 | 1 | 1 | 1 | 0 | 0 | 0 |
| 6  | 0 | 0 | 0 | 1 | 1 | 1 | 1 | 1 | 1 | 0 | 0 | 0 |
| 7  | 0 | 0 | 0 | 1 | 1 | 1 | 1 | 1 | 1 | 1 | 0 | 0 |
| 8  | 0 | 0 | 1 | 1 | 1 | 1 | 1 | 1 | 1 | 1 | 0 | 0 |
| 9  | 0 | 0 | 1 | 1 | 1 | 1 | 1 | 1 | 1 | 1 | 1 | 0 |
| 10 | 0 | 1 | 1 | 1 | 1 | 1 | 1 | 1 | 1 | 1 | 1 | 0 |
| 11 | 0 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

FIG. 15

| FRAME TYPE | L1 | R1 | L2 | R2 | L3 | R3 | L4 | R4 |
|---|---|---|---|---|---|---|---|---|
| USED DRIVE GRADATION TABLE | A | A | B | B | A | A | B | B |

⟶ TIME

DRIVE GRADATION TABLE C

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 | 0 |
| 3 | 1 | 1 | 1 | 0 | 0 | 0 | 0 | 0 | 0 | 0 | 0 | 0 |
| 4 | 1 | 1 | 1 | 1 | 0 | 0 | 0 | 0 | 0 | 0 | 0 | 0 |
| 5 | 1 | 1 | 1 | 1 | 1 | 0 | 0 | 0 | 0 | 0 | 0 | 0 |
| 6 | 1 | 1 | 1 | 1 | 1 | 1 | 0 | 0 | 0 | 0 | 0 | 0 |
| 7 | 1 | 1 | 1 | 1 | 1 | 1 | 1 | 0 | 0 | 0 | 0 | 0 |
| 8 | 1 | 1 | 1 | 1 | 1 | 1 | 1 | 1 | 0 | 0 | 0 | 0 |
| 9 | 1 | 1 | 1 | 1 | 1 | 1 | 1 | 1 | 1 | 0 | 0 | 0 |
| 10 | 1 | 1 | 1 | 1 | 1 | 1 | 1 | 1 | 1 | 1 | 0 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

DRIVE GRADATION TABLE D

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 1 | 1 |
| 3 | 0 | 0 | 0 | 0 | 0 | 0 | 0 | 0 | 0 | 1 | 1 | 1 |
| 4 | 0 | 0 | 0 | 0 | 0 | 0 | 0 | 0 | 1 | 1 | 1 | 1 |
| 5 | 0 | 0 | 0 | 0 | 0 | 0 | 0 | 1 | 1 | 1 | 1 | 1 |
| 6 | 0 | 0 | 0 | 0 | 0 | 0 | 1 | 1 | 1 | 1 | 1 | 1 |
| 7 | 0 | 0 | 0 | 0 | 0 | 1 | 1 | 1 | 1 | 1 | 1 | 1 |
| 8 | 0 | 0 | 0 | 0 | 1 | 1 | 1 | 1 | 1 | 1 | 1 | 1 |
| 9 | 0 | 0 | 0 | 1 | 1 | 1 | 1 | 1 | 1 | 1 | 1 | 1 |
| 10 | 0 | 0 | 1 | 1 | 1 | 1 | 1 | 1 | 1 | 1 | 1 | 1 |
| 11 | 0 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

FIG. 20
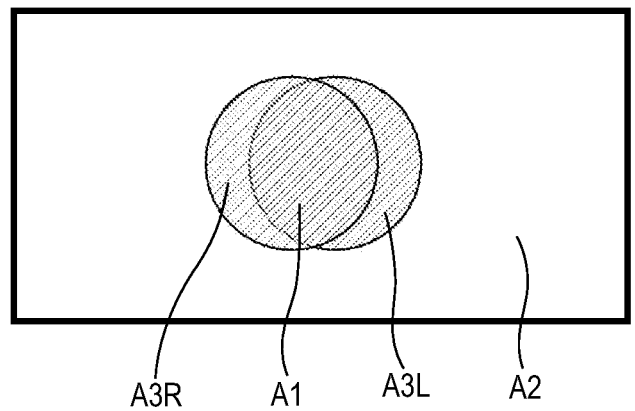
FIG. 21
| AREA NAME | LEFT-EYE IMAGE INDICATED | RIGHT-EYE IMAGE INDICATED | LEFT-EYE IMAGE INDICATED | RIGHT-EYE IMAGE INDICATED | LEFT-EYE IMAGE INDICATED | RIGHT-EYE IMAGE INDICATED |
|---|---|---|---|---|---|---|
| A1 | H | H | H | H | H | H |
| A2 | L | L | L | L | L | L |
| A3R | L | H | L | H | L | H |
| A3L | H | L | H | L | H | L |
FIG. 22
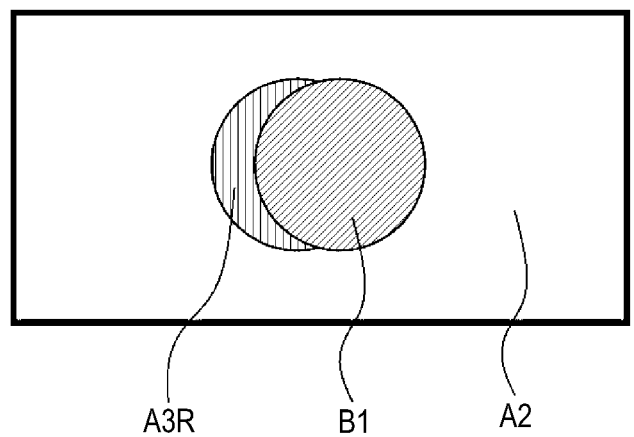

FRAME 0   FRAME 1   FRAME 2   FRAME 3

DRIVE GRADATION TABLE E

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 1 | 0 | 0 | 0 | 0 | 0 | 0 |
| 2 | 0 | 0 | 0 | 0 | 0 | 1 | 1 | 0 | 0 | 0 | 0 | 0 |
| 3 | 0 | 0 | 0 | 0 | 1 | 1 | 1 | 0 | 0 | 0 | 0 | 0 |
| 4 | 0 | 0 | 0 | 0 | 1 | 1 | 1 | 1 | 0 | 0 | 0 | 0 |
| 5 | 0 | 0 | 0 | 1 | 1 | 1 | 1 | 1 | 0 | 0 | 0 | 0 |
| 6 | 0 | 0 | 0 | 1 | 1 | 1 | 1 | 1 | 1 | 0 | 0 | 0 |
| 7 | 0 | 0 | 1 | 1 | 1 | 1 | 1 | 1 | 1 | 0 | 0 | 0 |
| 8 | 0 | 0 | 1 | 1 | 1 | 1 | 1 | 1 | 1 | 1 | 0 | 0 |
| 9 | 0 | 1 | 1 | 1 | 1 | 1 | 1 | 1 | 1 | 1 | 0 | 0 |
| 10 | 0 | 1 | 1 | 1 | 1 | 1 | 1 | 1 | 1 | 1 | 1 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

DRIVE GRADATION TABLE F

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 1 | 0 | 0 | 0 | 0 | 0 |
| 2 | 0 | 0 | 0 | 0 | 0 | 1 | 1 | 0 | 0 | 0 | 0 | 0 |
| 3 | 0 | 0 | 0 | 0 | 0 | 1 | 1 | 1 | 0 | 0 | 0 | 0 |
| 4 | 0 | 0 | 0 | 0 | 1 | 1 | 1 | 1 | 0 | 0 | 0 | 0 |
| 5 | 0 | 0 | 0 | 0 | 1 | 1 | 1 | 1 | 1 | 0 | 0 | 0 |
| 6 | 0 | 0 | 0 | 1 | 1 | 1 | 1 | 1 | 1 | 0 | 0 | 0 |
| 7 | 0 | 0 | 0 | 1 | 1 | 1 | 1 | 1 | 1 | 1 | 0 | 0 |
| 8 | 0 | 0 | 1 | 1 | 1 | 1 | 1 | 1 | 1 | 1 | 0 | 0 |
| 9 | 0 | 1 | 1 | 1 | 1 | 1 | 1 | 1 | 1 | 1 | 0 | 0 |
| 10 | 0 | 1 | 1 | 1 | 1 | 1 | 1 | 1 | 1 | 1 | 1 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

VIDEO DISPLAY APPARATUS

CROSS-REFERENCE TO RELATED APPLICATIONS

This application claims priority from Japanese patent application number 2012-204030, filed on Sep. 18, 2012, the disclosure of which is hereby incorporated by reference.

BACKGROUND OF THE INVENTION

1. Field of the Invention

This invention generally relates to a video or image display apparatus, and particularly relates to an apparatus designed to indicate an image represented by an input digital video signal while dividing every frame related to the video signal into a plurality of subframes.

2. Description of the Related Art

In a typical 3D (three dimensional) video or image display apparatus, a pair of 2D (two dimensional) images having a binocular parallax or disparity therebetween in the horizontal direction are indicated on a display screen as images for viewer's right and left eyes respectively. The indicated images are actually observed by a viewer via viewer's right and left eyes respectively so that the viewer can perceive a subject indicated on the display screen as stereoscopic one.

A known 3D video projection system includes two liquid-crystal projectors to indicate images for viewer's right and left eyes respectively.

Another known 3D video projection system includes a single liquid-crystal projector designed so that images for viewer's right eye and images for viewer's left eye are alternately indicated on a single screen. A viewer wears a pair of glasses with liquid crystal shutters which alternately obstruct the sights of viewer's right and left eyes so that viewer's right and left eyes are allowed to independently observe the indicated right-eye and left-eye images respectively.

Japanese patent application publication number 2009-31523 discloses a stereoscopic image display device for use with liquid-crystal shutter glasses to be worn by a viewer. The glasses have shutters for viewer's right and left eyes respectively. There can be crosstalk between images viewed by viewer's right eye and those by viewer's left eye. In Japanese application 2009-31523, timings of switching the shutters in the glasses are controlled to suppress crosstalk occurring when the frame rate is high.

Japanese patent application publication number 2012-103357 discloses a 3D video display apparatus including a single liquid-crystal projector and a drive gradation table. In Japanese application 2012-103357, every frame represented by a video signal is divided into a plurality of subframes. To suppress crosstalk, the drive gradation table is designed so that the number of active subframes for a frame increases as a gradation value of the frame rises. In some cases, transverse-direction electric fields (lateral electric fields) occur between pixels of a liquid-crystal device. It is desirable to prevent the transverse-direction electric fields from considerably deteriorating indicated images.

SUMMARY OF THE INVENTION

It is an object of this invention to provide a video display apparatus which can reduce crosstalk while preventing transverse-direction electric fields (lateral electric fields) occurring between pixels of a liquid-crystal device from considerably deteriorating indicated images.

A first aspect of this invention provides a video display apparatus comprising a subframe data generating section configured to change every frame regarding an input video signal into a sequence of subframes defined by step bit pulses respectively, and generate subframe data from the input video signal while alternately using a first drive gradation table and a second drive gradation table; wherein the first drive gradation table is designed so that a subframe at or near a middle point of the sequence is assigned a pixel activated state when a drive gradation related to the input video signal is 1, a number of subframes assigned the pixel activated state increases each time the drive gradation increases by 1, a subframe newly assigned the pixel activated state is a subframe following the subframe or subframes which have already been assigned the pixel activated state when the drive gradation increases from an odd number to a next even number, and a subframe newly assigned the pixel activated state is a subframe preceding the subframes which have already been assigned the pixel activated state when the drive gradation increases from an even number to a next odd number equal to or greater than 3; wherein the second drive gradation table is designed so that a subframe at or near a middle point of the sequence is assigned the pixel activated state when the drive gradation is 1, a number of subframes assigned the pixel activated state increases each time the drive gradation increases by 1, a subframe newly assigned the pixel activated state is a subframe preceding the subframe or subframes which have already been assigned the pixel activated state when the drive gradation increases from an odd number to a next even number, and a subframe newly assigned the pixel activated state is a subframe following the subframes which have already been assigned the pixel activated state when the drive gradation increases from an even number to a next odd number equal to or greater than 3; a liquid-crystal display device; and a drive section configured to drive the liquid-crystal display device in response to the subframe data generated by the subframe data generating section.

A second aspect of this invention is based on the first aspect thereof, and provides a video display apparatus wherein the input video signal is a 3D video signal, and further comprising a signal processing section configured to convert the 3D video signal into a conversion-result video signal in which signals for viewer's right eye and signals for viewer's left eye are alternately arranged, wherein the subframes are defined regarding the conversion-result video signal by the step bit pulses respectively.

A third aspect of this invention is based on the first aspect thereof, and provides a video display apparatus wherein the subframe data generating section alternately uses the first drive gradation table and the second drive gradation table in response to updating of the frame regarding to the input video signal.

A fourth aspect of this invention is based on the second aspect thereof, and provides a video display apparatus wherein the right-eye signals and the left-eye signals in the conversion-result video signal are in pairs each having temporally-adjacent right-eye and left-eye signals, and the subframe data generating section uses the first drive gradation table for alternate ones of the pairs and uses the second drive gradation table for the other alternate ones of the pairs.

A fifth aspect of this invention is based on the first aspect thereof, and provides a video display apparatus wherein the subframe data generating section alternately uses the first drive gradation table and the second drive gradation table when the drive gradation is a range from a prescribed low value to a prescribed intermediate value, and uses only one of the first drive gradation table and the second drive gradation table when the drive gradation is greater than the prescribed intermediate value.

A sixth aspect of this invention is based on the first aspect thereof, and provides a video display apparatus further comprising a lookup table section configured to convert every N-bit data piece of the input video signal into an (M+F+D)-bit data piece through inverse gamma correction and linear interpolation; an error diffusing section configured to convert the (M+F+D)-bit data piece into (M+F)-bit data piece through error diffusion; and a frame rate control section configured to convert the (M+F)-bit data piece into an M-bit data piece through frame rate control, and feed the M-bit data piece to the subframe data generating section; wherein N, M, F, and D denote predetermined natural numbers respectively, and (M+F+D) is greater than N.

BRIEF DESCRIPTION OF THE DRAWINGS

FIG. 14 is a diagram of drive gradation tables used by a subframe data generating section in FIGS. 7 and 8.

FIG. 15 is a time-domain diagram showing the relation between a used drive gradation table and a frame represented by a decoded video signal inputted into the drive circuit in FIGS. 5 and 7.

FIG. 20 is a diagram of a pair of right-eye and left-eye images projected onto a screen by the display apparatus in FIG. 2.

FIG. 21 is a diagram showing the relation between the gradations of areas in FIG. 20 and the type of an indicated image.

FIG. 22 is a diagram showing a view of the right-eye and left-eye images in FIG. 20 which is obtained through only the left-eye portion of the liquid-crystal shutter glasses in FIGS. 1 and 5.

DETAILED DESCRIPTION OF THE INVENTION

First Embodiment

Figure 1:
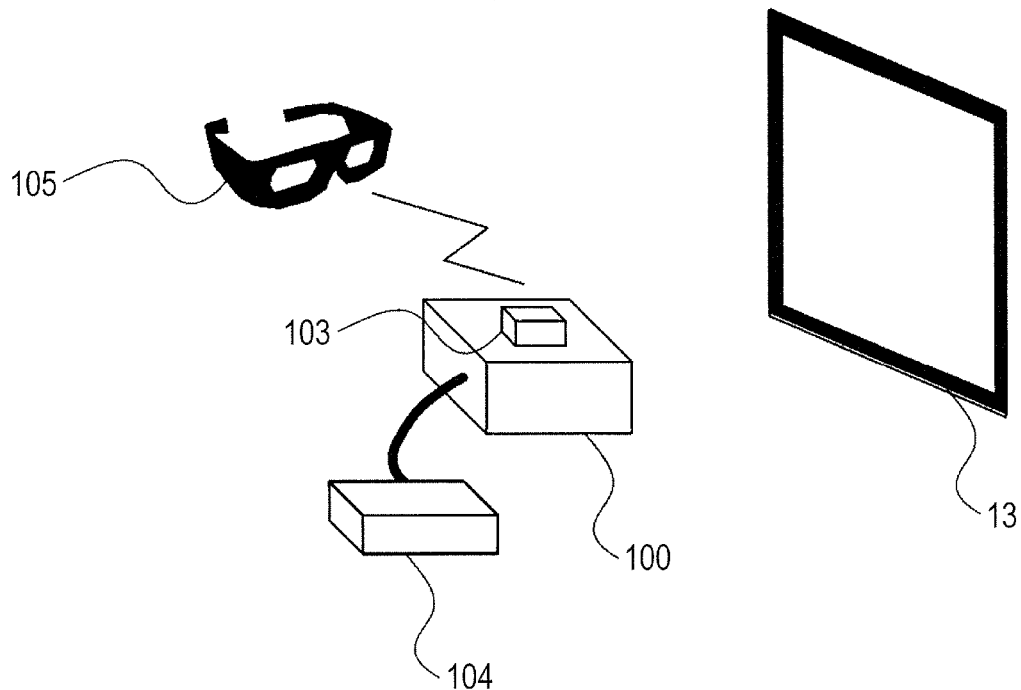
FIG. 1 is a perspective diagram of a stereoscopic video display apparatus according to a first embodiment of this invention.

FIG. 1 shows a video or image display apparatus according to a first embodiment of this invention. The apparatus of FIG. 1 is, for example, a stereoscopic or 3D (three dimensional) video display apparatus including a liquid-crystal display apparatus 100. As will be mentioned later, the display apparatus 100 has a display panel including a reflective liquid-crystal display device of an active matrix type.

With reference to FIG. 1, a signal source 104 sends a 3D video signal to the display apparatus 100. A conventional circuit in the display apparatus 100 converts the 3D video signal into a video signal for viewer's right eye and a video signal for viewer's left eye. The display apparatus 100 alternately projects images represented by the right-eye video signal and images represented by the left-eye video signal onto a screen 13.

A transmitter 103 placed in or connected with the display apparatus 100 sends a shutter drive signal to liquid-crystal shutter glasses 105 to be worn by a viewer. The glasses 105 include a liquid-crystal shutter for viewer's right eye and a liquid-crystal shutter for viewer's left eye. The right-eye shutter and the left-eye shutter are controlled by the shutter drive signal so that the viewer can perceive a subject indicated on the screen 13 as stereoscopic one.

Figure 2:
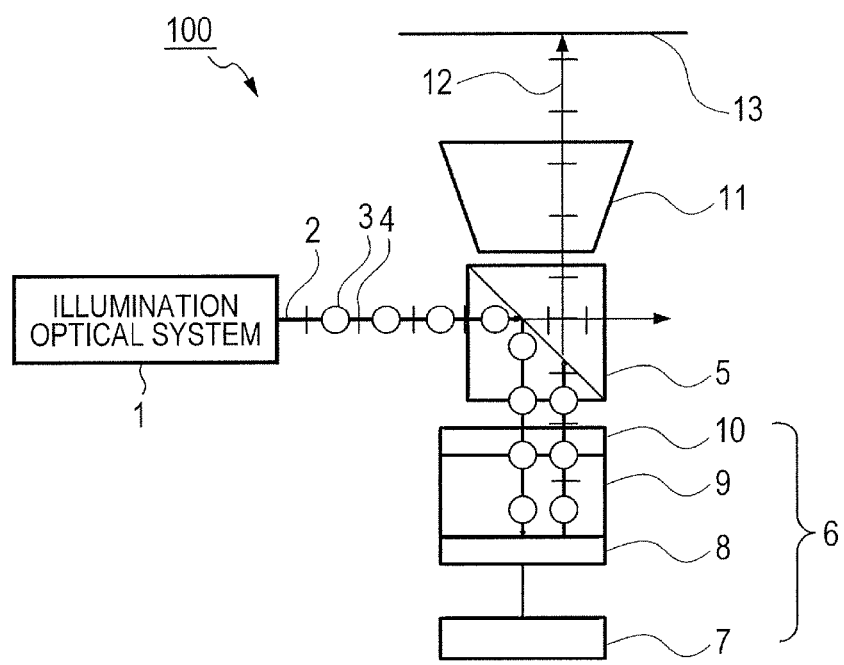
FIG. 2 is a diagram of a liquid-crystal display apparatus in FIG. 1.

As shown in FIG. 2, the display apparatus 100 includes an illumination optical system 1, a polarization beam splitter (PBS) 5, a reflective liquid-crystal display device 6, and a projection lens 11. The reflective liquid-crystal display device 6 is of an active matrix type, and has a structure in which liquid crystal 9 is fluid-tightly placed between a common electrode (a transparent electrode) 10 and each pixel electrode 8. The pixel electrode 8 is electrically connected with a pixel circuit 7.

The illumination optical system 1 emits light 2 containing s-polarized light 3 and p-polarized light 4. The emitted light 2 is incident to the PBS 5. The s-polarized light 3 in the incident light 2 is reflected by a polarization splitting plane in the PBS 5 toward the reflective liquid-crystal display device 6. The reflected s-polarized light 3 is incident to the reflective liquid-crystal display device 6. On the other hand, the p-polarized light 4 in the incident light 2 passes through the polarization splitting plane in the PBS 5.

In the reflective liquid-crystal display device 6, the incident s-polarized light 3 successively travels through the common electrode 10 and the liquid crystal 9, and then reaches the pixel electrodes 8 and is reflected by the pixel electrodes 8 before traveling back through the liquid crystal 9 and the common electrode 10. The liquid crystal 9 modulates the incident s-polarized light 3 in accordance with a voltage applied between each pixel electrode 8 and the common electrode 10 by the pixel circuit 7. The incident s-polarized light 3 undergoes modulation when traveling in the liquid crystal 9. The modulation-result light contains s-polarized light and p-polarized light caused by the modulation. The modulation-result light travels from the common electrode 10 to the PBS 5.

The p-polarized light in the modulation-result light passes through the PBS 5 while the s-polarized light therein is reflected by the PBS 5. The modulation-result p-polarized light travels from the PBS 5 to the projection lens 11 before passing therethrough and then reaching the screen 13. The lens 11 projects a periodically updated image represented by the modulation-result p-polarized light onto the screen 13.

The modulation-result p-polarized light traveling from the PBS 5 to the projection lens 11 is referred to as the output light also. In the following description, the intensity of the output light means the illuminance thereof that is measured at the screen 13.

Figure 3:
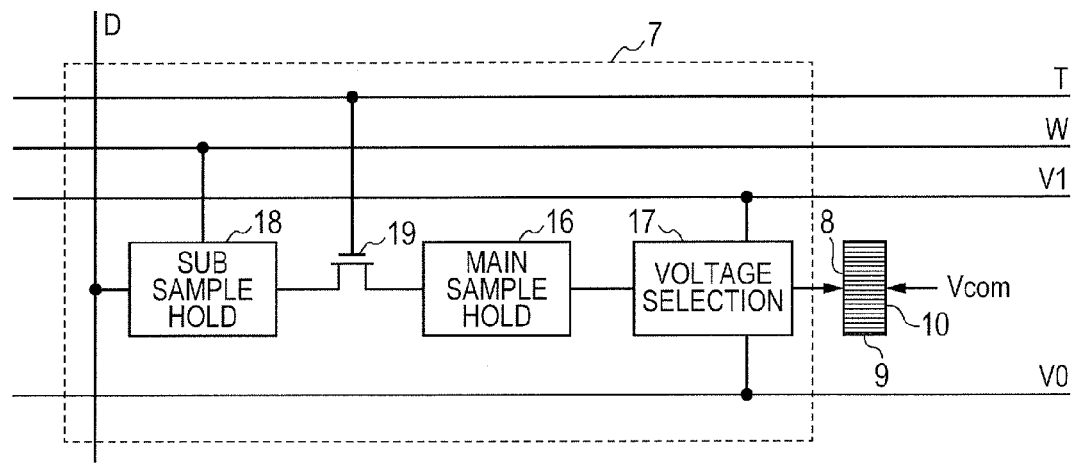
FIG. 3 is a diagram of each pixel of a reflective liquid-crystal display device in FIG. 2.

As shown in FIG. 3, each of pixel-corresponding portions (pixels or pixel portions) of the reflective liquid-crystal display device 6 has a structure in which the liquid crystal 9 is sandwiched between a pixel electrode 8 and the common electrode 10. Each pixel portion of the reflective liquid-crystal display device 6 is provided with a pixel circuit 7 including a main sample hold section 16, a voltage selection circuit 17, a sub sample hold section 18, and a transfer-purpose switch section 19.

Each of the main sample hold section 16 and the sub sample hold section 18 includes a flip-flop of an SRAM structure. The switch section 19 has a transistor such as a TFT or an FET. The sub sample hold section 18 is connected with a column data line D and a row selection line W. An output side of the sub sample hold section 18 is connected with a source of the switch section 19. A drain of the switch section 19 is connected with an input side of the main sample hold section 16. A gate of the switch section 19 is connected with a transfer-purpose signal line T. An output side of the main sample hold section 16 is connected with the voltage selection circuit 17. The voltage selection circuit 17 is connected with a blanking voltage line V0 and a drive voltage line V1. The voltage selection circuit 17 is connected with the pixel electrode 8 to apply a selected voltage thereto. The common electrode 10 is subjected to a common voltage Vcom.

Figure 4:
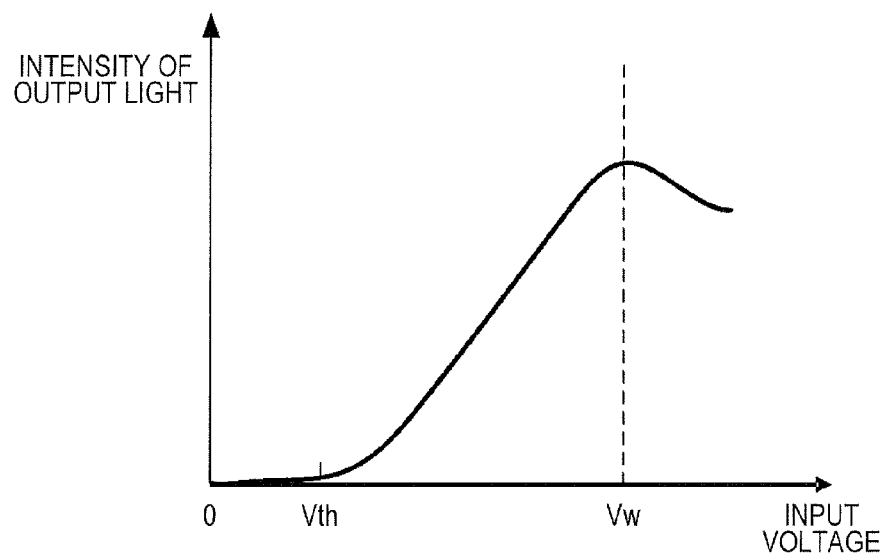
FIG. 4 is a diagram showing the relation between the intensity of output light emitted from liquid crystal and the voltage difference between a pixel electrode and a common electrode in FIGS. 2 and 3.
Figure 7:
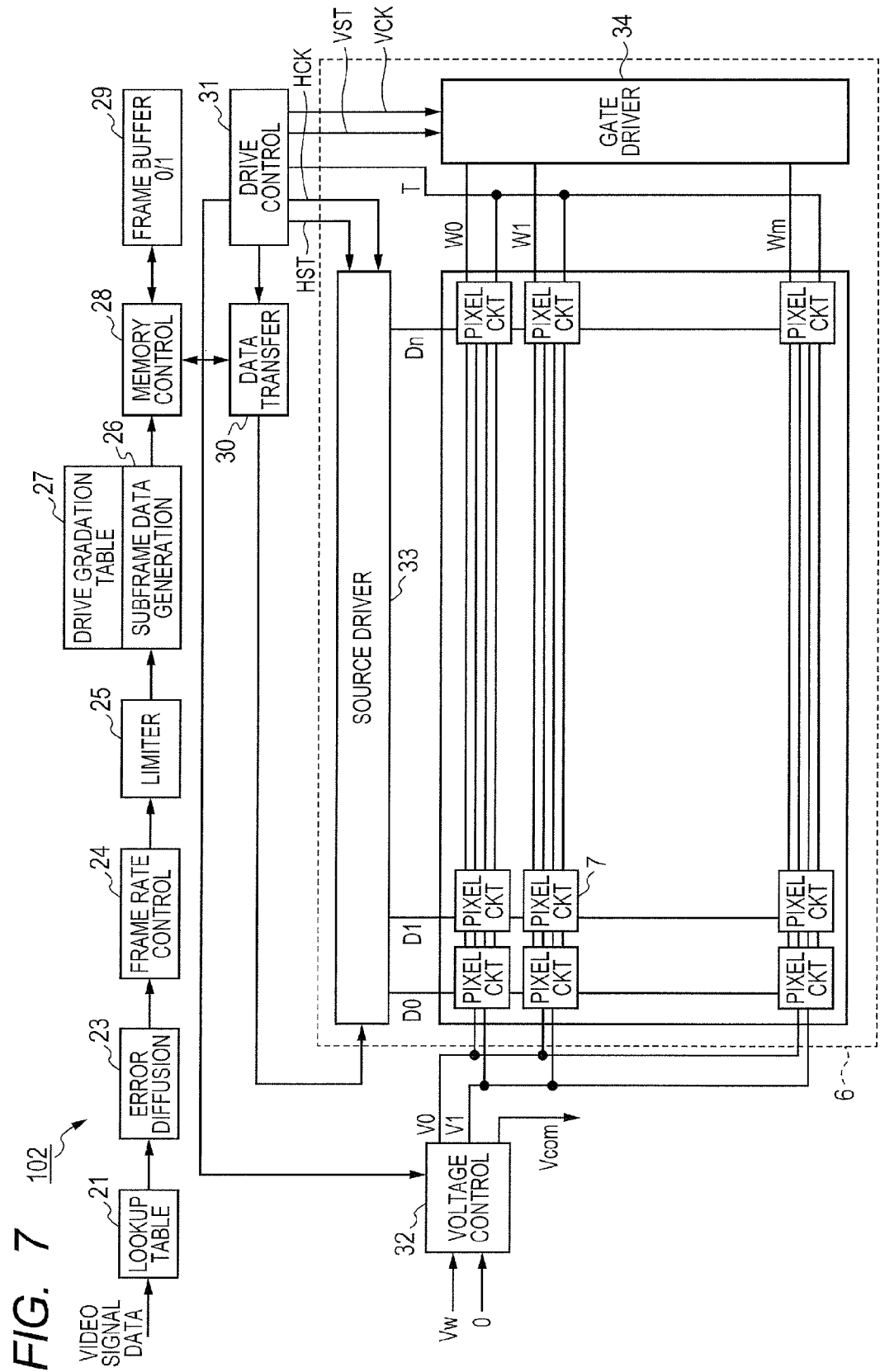
FIG. 7 is a block diagram of a drive circuit and the reflective liquid-crystal display device in FIG. 5.

A pixel data piece on the column data line D is sampled and held by the sub sample hold section 18 in response to the state of the row selection line W which is decided by a gate driver 34 (see FIG. 7). The switch section 19 changes between a conductive state and a nonconductive state in response to the state of the transfer-purpose signal line T which is decided by a drive control section 31 (see FIG. 7). The state of the transfer-purpose signal line T is defined by a transfer-purpose signal T fed from the drive control section 31. When the switch section 19 is in the conductive state, the pixel data piece is transmitted from the sub sample hold section 18 to the main sample hold section 16. Then, the pixel data piece is transferred to the voltage selection circuit 17 through the main sample hold section 16. The voltage selection circuit 17 selects either a voltage at the blanking voltage line V0 or a voltage at the drive voltage line V1 in response to the pixel data piece, and applies the selected voltage to the pixel electrode 8. With reference to FIG. 4, the intensity of output light emitted from the liquid crystal 9 varies as a function of an input voltage or a liquid-crystal drive voltage, that is, a voltage difference between the pixel electrode 8 and the common electrode 10. The intensity of the output light starts appreciably rising when the input voltage increases from a threshold voltage Vth. The intensity of the output light is very low and the pixel portion of the reflective liquid-crystal display device 6 is in a black state when the input voltage is zero or equal to a blanking voltage (for example, when both the pixel electrode 8 and the common electrode 10 are subjected to a ground (GND) voltage). The intensity of the output light starts being saturated when the input voltage increases to a given voltage Vw called a saturation voltage. A white level regarding the pixel portion of the reflective liquid-crystal display device 6 is provided by the saturation voltage Vw.

Figure 5:
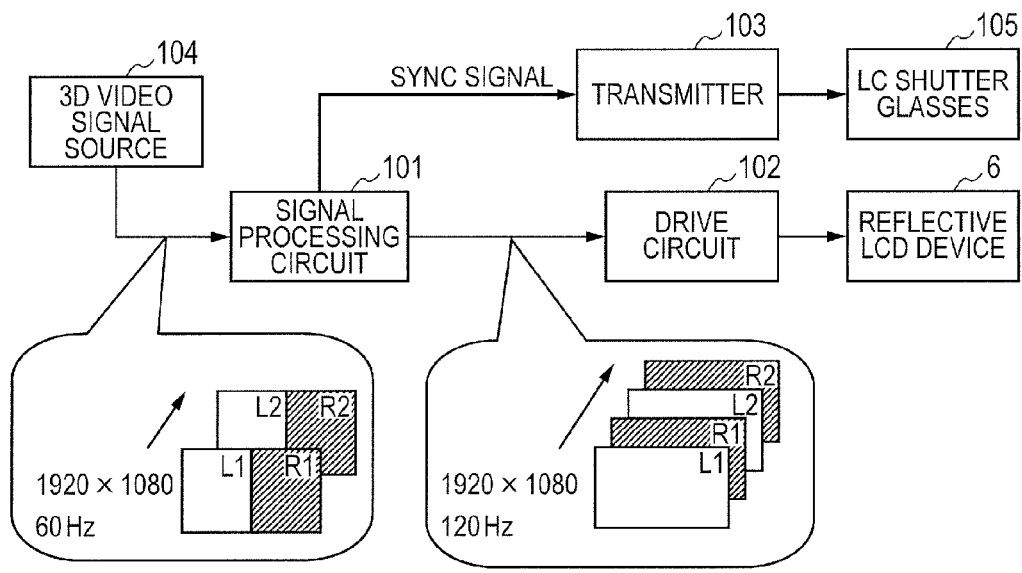
FIG. 5 is a block diagram of the stereoscopic video display apparatus in FIG. 1.

With reference to FIG. 5, the 3D video signal from the signal source 104 is inputted into a signal processing circuit 101 in the display apparatus 100. The 3D video signal is of, for example, a side-by-side system or format with a frame rate of 60 Hz. Every frame represented by the 3D video signal consists of, for example, 1920 by 1080 pixels, and a pair of an image for user's right eye and an image for user's left eye which are arranged on a side-by-side basis. The signal processing circuit 101 separates the input 3D video signal into a signal for viewer's right eye and a signal for viewer's left eye. The signal processing circuit 101 processes each of the right-eye signal and the left-eye signal to horizontally expand every frame represented by the signal to a size equal to the display screen size. The signal processing circuit 101 combines the expanded right-eye signal and the expanded left-eye signal in a manner such that frames represented by the expanded right-eye signal alternate with frames represented by the expanded left-eye signal as viewed along a time base. At the same time, the signal processing circuit 101 doubles the frame rate. Thus, the combination-result video signal has a frame rate of, for example, 120 Hz. Every frame represented by the combination-result video signal consists of, for example, 1920 by 1080 pixels. The combination-result video signal is referred to as the decoded video signal also. The signal processing circuit 101 feeds the decoded video signal to a drive circuit 102 in the display apparatus 100. The drive circuit 102 drives the reflective liquid-crystal display device 6 in response to the decoded video signal.

Figure 6:
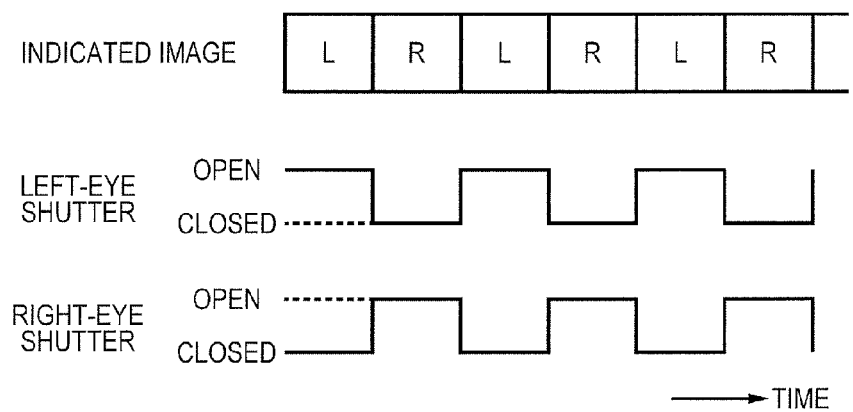
FIG. 6 is a time-domain diagram of an indicated image stream and the states of liquid-crystal shutters in a pair of glasses in FIGS. 1 and 5.

In addition, the signal processing circuit 101 generates a sync signal synchronized with the decoded video signal. The signal processing circuit 101 feeds the generated sync signal to the transmitter 103. The transmitter 103 decides desired timings of driving the liquid-crystal shutters of the glasses 105 in response to the sync signal, and generates a shutter drive signal in accordance with the decided timings. The transmitter 103 sends the shutter drive signal to the liquid-crystal shutter glasses 105. The right-eye shutter and the left-eye shutter in the glasses 105 are controlled by the shutter drive signal in a manner shown in FIG. 6. Specifically, when every right-eye image R is indicated on the screen 13, the right-eye shutter is open and the left-eye shutter is closed so that the indicated right-eye image R can be observed by viewer's right eye only. When every left-eye image L is indicated on the screen 13, the left-eye shutter is open and the right-eye shutter is closed so that the indicated left-eye image L can be observed by viewer's left eye only.

The 3D video signal from the signal source 104 may have a frame rate different from 60 Hz. For example, the frame rate of the 3D video signal may be 24 Hz or 50 Hz. The 3D video signal from the signal source 104 may be of a 3D video format other than the side-by-side format. For example, the 3D video signal may be of a frame packing format, a top and bottom format, or a line-by-line format. As previously mentioned, the signal processing circuit 101 changes the 3D video signal into the decoded video signal having a frame rate equal to, for example, twice that of the 3D video signal. The signal processing circuit 101 may implement frame rate conversion higher than "double" or "twice". The frame resolution of the 3D video signal may differ from that corresponding to 1920 by 1080 pixels. The frame resolution of the decoded video signal may differ from that corresponding to 1920 by 1080 pixels.

As shown in FIG. 7, the drive circuit 102 includes a lookup table section 21 receiving every N-bit data piece formed by a pixel-corresponding segment (a pixel segment) of the decoded video signal from the signal processing circuit 101, where N denotes a predetermined natural number. The N-bit data piece indicates which of different gradations the target pixel (the pixel of interest) is assigned. The N-bit data piece may be referred to as the N-bit pixel data piece. The lookup table section 21 converts the N-bit data piece into an (M+F+D)-bit data piece, where M, F, and D denote predetermined natural numbers respectively, and M+F+D>N. Specifically, M denotes the number of bits indicating the number of subframes into which every frame represented by the decoded video signal fed to the drive circuit 102 is divided, and D denotes the number of bits used by an error diffusing section 23 which follows the lookup table section 21. In addition, F denotes the number of bits used by a frame rate control section 24 which follows the error diffusing section 23.

Figure 8:
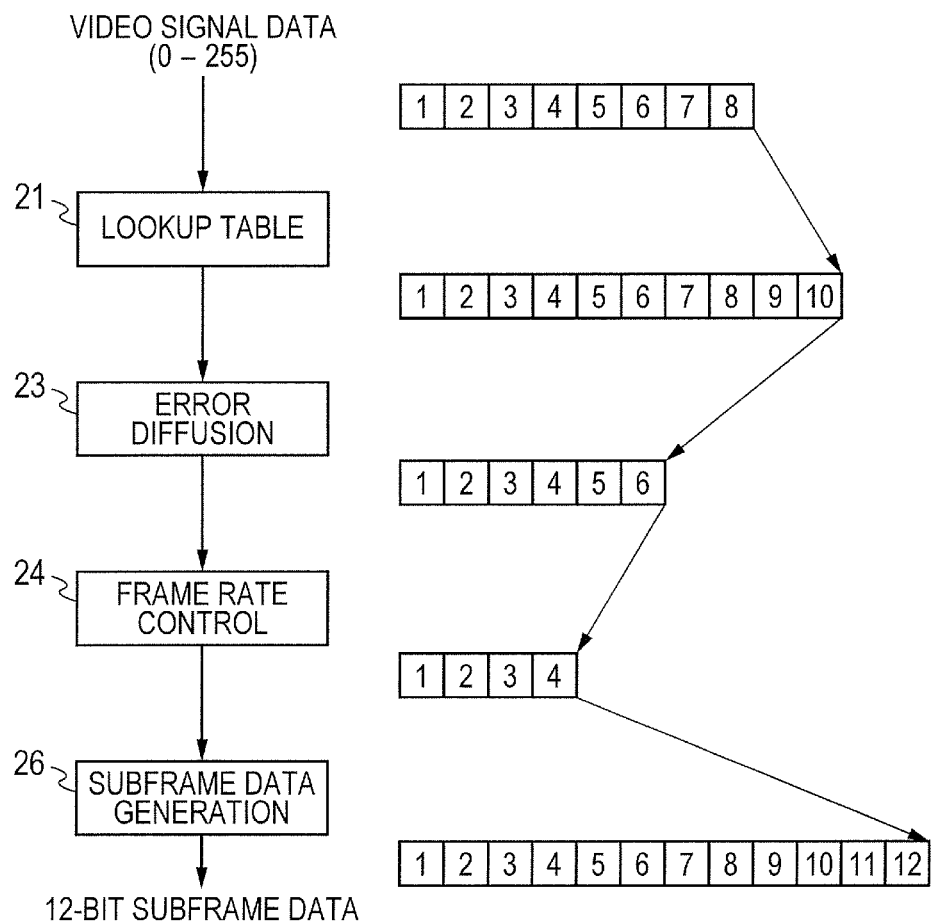
FIG. 8 is a diagram showing serially-connected sections in the drive circuit of FIG. 7 and the numbers of bits forming pixel data pieces inputted into and outputted from the sections.

With reference to FIG. 8, every N-bit data piece received by or inputted into the lookup table section 21 is, for example, an 8-bit data piece (N=8), and an example of bit structures of pixel data pieces inputted into and outputted from processing stages or sections is shown there. In the example of FIG. 8, the number of bits used by the error diffusing section 23 is four (D=4), and the number of bits used by the frame rate control section 24 is two (F=2). In addition, the number of bits indicating the number of subframes into which every frame represented by the decoded video signal fed to the drive circuit 102 is divided is four (M=4). There are 12 different drive gradations or tones except black. Specifically, these gradations or tones are expressed as being of "1" to "12" respectively, where a gradation of "12" is the maximum (white). A gradation or tone of "0" is assigned to black.

Generally, a video signal is subjected to gamma correction before being inputted into an image display apparatus, and hence the image display apparatus is required to subject the input video signal to inverse gamma correction to restore linear gradation properties. According to the inverse gamma correction, an output is proportional to an input to the power of 2.2. An output characteristic resulting from the inverse gamma correction is thus called "gamma 2.2". The lookup table section 21 functions to convert the input-output characteristic of the reflective liquid-crystal display device 6 to provide a liquid-crystal display apparatus having an output characteristic being gamma 2.2.

The lookup table section 21 is previously adjusted so that a 10-bit output therefrom will be accorded with an arbitrary or prescribed output characteristic (for example, gamma 2.2). According to an example, 12 sample images produced by display drive with 12 different drive gradations (tones) except black is projected onto the screen 13 on a one-by-one basis while the illuminance at the screen 13 is measured by an illuminometer. As a result, 12 measured illuminances are obtained for the 12 drive gradations respectively. Then, luminances between the 12 measured illuminances are calculated through linear interpolation with 6 bits ((M+F) bits, 64 gradations) for every interval between adjacent two among the 12 measured illuminances. The measured illuminances and the calculated illuminances are arranged to constitute a set of different illuminances corresponding to gradations in the range from a gradation of "0" to a gradation of "768". Different illuminance data pieces each composed of 10 bits are assigned to the different illuminances, respectively. From these illuminance data pieces, 256 illuminance data pieces are selected which are accorded with an arbitrary or prescribed output characteristic (for example, gamma 2.2). The 256 selected illuminance data pieces each composed of 10 bits are previously stored in the lookup table section 21 as a lookup table.

The lookup table section 21 has a lookup table holding 256 illuminance data pieces each composed of 10 bits (that is, "2 to the power of 8" gradations each represented by (4+2+4) bits). This design corresponds to the case where N=8, M=4, F=2, and D=4 for "2 to the power of N" gradations each represented by (M+F+D) bits. The lookup table section 21 converts every input 8-bit data piece into a 10-bit data piece and outputs the 10-bit data piece.

With reference back to FIG. 7, the lookup table section 21 converts every input N-bit data piece into an (M+F+D)-bit data piece and outputs the (M+F+D)-bit data piece to the error diffusing section 23. The error diffusing section 23 converts every (M+F+D)-bit data piece from the lookup table section 21 into an (M+F)-bit data piece by diffusing information represented by the lower D bits of the (M+F+D)-bit data piece to pixels near the pixel represented by the (M+F+D)-bit data piece, that is, the target pixel or the pixel of interest. In the example of FIG. 8, the error diffusing section 23 diffuses information represented by the lower 4 bits of every 10-bit data piece to pixels near the target pixel or the pixel of interest (the pixel represented by the 10-bit data piece), and changes and quantizes the 10-bit data piece into a 6-bit data piece corresponding to the higher 6 bits of the 10-bit data piece.

The error diffusing section 23 implements error diffusion that is a process of diffusing an error (an indication error) between a pixel-corresponding segment of a video signal to be indicated and an actual indication value to pixels near the target pixel or the pixel of interest, and thereby compensating for gradation insufficiency.

Figure 9:
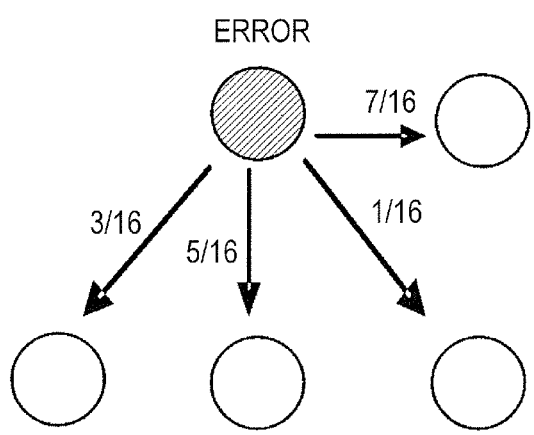
FIG. 9 is a diagram of the diffusion of an indication error of a target pixel to nearby pixels.

With reference to FIG. 9, an example of the error diffusion by the error diffusing section 23 will be explained below. The lower 4 bits of every pixel-corresponding video signal segment (every pixel video signal segment) to be indicated are labeled as an indication error, and the indication error multiplied by a weighting factor of $7/16$ is added to the value of a signal segment representing the pixel immediately rightward of the target pixel. The indication error multiplied by a weighting factor of 3/16, the indication error multiplied by a weighting factor of 5/16, and the indication error multiplied by a weighting factor of 1/16 are added to the value of a signal segment representing the pixel immediately leftward and downward of the target pixel, the value of a signal segment representing the pixel immediately below the target pixel, and the value of a signal segment representing the pixel immediately rightward and downward of the target pixel, respectively.

In this way, the error diffusing section 23 diffuses an indication error for the target pixel to pixels near the target pixel on an intra-frame basis. The operation of the error diffusing section 23 will be explained below in more detail.

Figure 10:
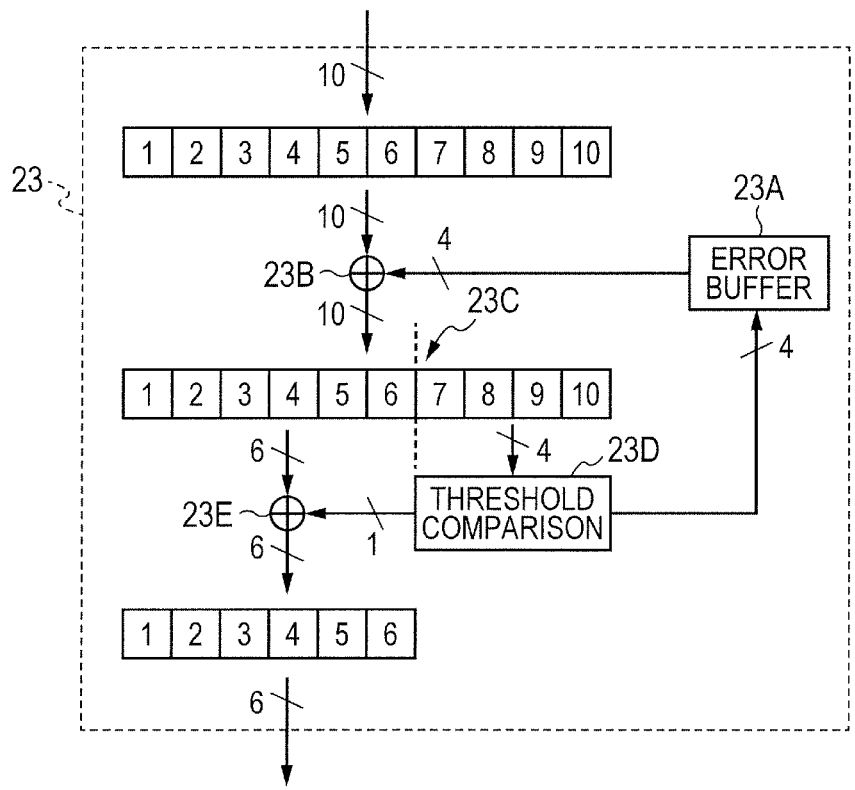
FIG. 10 is a diagram showing the operation and structure of an error diffusing section in FIGS. 7 and 8.

With reference to FIG. 10, the error diffusing section 23 includes an error buffer 23A storing 4-bit data pieces representing indication errors diffused from previously-processed pixels. The 4-bit data pieces in the error buffer 23A are assigned to pixels in at least two successive lines of a frame, respectively. For example, the 4-bit data pieces in the error buffer 23A are periodically reset on a line-by-line basis while the oldest of the lines related to the 4-bit data pieces in the error buffer 23A is replaced by a new line. The error buffer 23A may have a 1-frame size so that the 4-bit data pieces therein can be assigned to pixels of every frame, respectively. In this case, the error buffer 23A may be periodically reset on a multiline-by-multiline basis or a frame-by-frame basis. In the error diffusing section 23, the value of every 10-bit data piece (corresponding to the target pixel) from the lookup table section 10 and the value of a 4-bit data piece in the error buffer 23A which represents an indication error to be distributed to the 10-bit data piece are added at a stage 23B. The addition-result 10-bit data piece is divided at a stage 23C into a set of higher 6 bits and a set of lower 4 bits.

Different states of the division-result set of lower 4 bits are assigned to different indication errors as follows:

| 4 lower bits | indication error |
|---|---|
| 0000 | 0 |
| 0001 | +1 |
| 0010 | +2 |
| 0011 | +3 |
| 0100 | +4 |
| 0101 | +5 |
| 0110 | +6 |
| 0111 | +7 |
| 1000 | −7 |
| 1001 | −6 |
| 1010 | −5 |
| 1011 | −4 |
| 1100 | −3 |
| 1101 | −2 |
| 1110 | −1 |
| 1111 | 0 |

The indication error represented by the division-result set of lower 4 bits (the indication error of the target pixel) is multiplied by prescribed weighting factors to obtain weighted indication errors. Then, the weighted indication errors are added to the values of 4-bit data pieces in the error buffer 23A which correspond to pixels to which the indication error of the target pixel should be diffused. As a result, ones among the 4-bit data pieces in the error buffer 23A are updated. In addition, at a stage 23D, the value of the division-result set of lower 4 bits is compared with a threshold given by a 4-bit set of "1000". When the value of the division-result set of lower 4 bits is greater than the threshold "1000", 1 is added to the value of the division-result set of higher 6 bits at a stage 23E. Specifically, when the division-result set of lower 4 bits is in one of states from "1001" to "1111" in the above assignment table, 1 is added to the value of the division-result set of higher 6 bits. Otherwise, the division-result set of higher 6 bits remains as it is. The resultant set of higher 6 bits is outputted from the error diffusing section 23.

Figure 12:
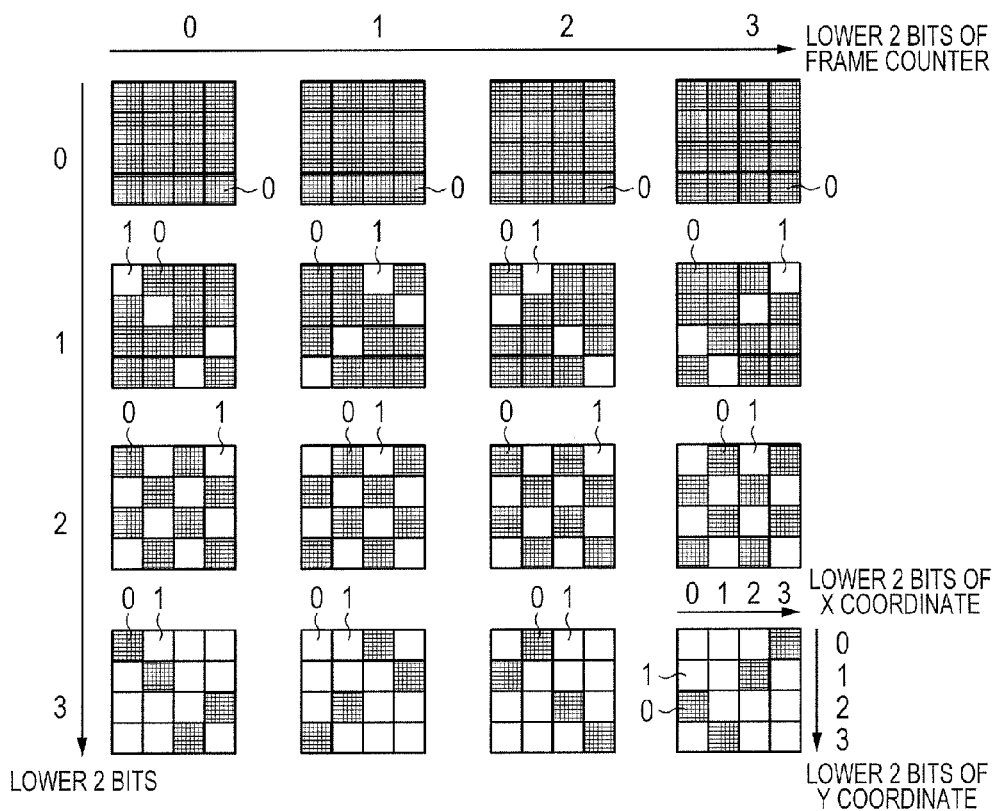
FIG. 12 is a diagram of a frame rate control table.

With reference back to FIG. 7, every (M+F)-bit data piece is inputted into the frame rate control section 24 from the error diffusing section 23. As will be explained later, the section 24 implements frame rate control (FRC) which is on an inter-frame basis. The section 24 includes a frame rate control table in which either a value of "1" or a value of "0" is held at each of different positions. An example of the contents of the frame rate control table is shown in FIG. 12. The frame rate control table in FIG. 12 has 16 blocks. Each of the blocks is composed of 4-by-4 segments corresponding to pixels respectively and each holding a value of "1" or a value of "0".

In the frame rate control section 24, a to-be-accessed position within the frame rate control table is decided by the value of lower F bits in the input (M+F)-bit data piece, pixel position information, and frame count information. Then, a held value is read out from the decided position in the frame rate control table. The read-out value is added to the value of higher M bits separated from the input (M+F)-bit data piece. A set of the addition-result M bits is labeled as an M-bit data piece to be outputted from the frame rate control section 24. In this way, the frame rate control section 24 converts every (M+F)-bit data piece into an M-bit data piece before outputting the M-bit data piece.

Frame rate control (FRC) is designed so that gradation control for every pixel is implemented through the use of "m" successive frames, and indication of the pixel is made active (on) during "n" frames among the "m" frames and is made inactive (off) during "m-n" remaining frames to substantially provide a finer variable or controllable gradation, where "m" denotes a predetermined natural number equal to or greater than 2 and "n" denotes a variable natural number greater than 0 but smaller than "m". The provided gradation is varied as the number "n" is changed relative to the number "m".

In the example of FIG. 8, every 6-bit data piece is inputted into the frame rate control section 24 from the error diffusing section 23. In the frame rate control section 24, a to-be-accessed position within the frame rate control table is decided by information represented by lower 2 bits in the input 6-bit data piece, information of the position of the target pixel relative to the overall or entire indication area, and frame count information. Then, a held value is read out from the decided position in the frame rate control table. The read-out value is added to the value of higher 4 bits separated from the input 6-bit data piece. A set of the addition-result 4 bits is labeled as a 4-bit data piece to be outputted from the frame rate control section 24.

Figure 11:
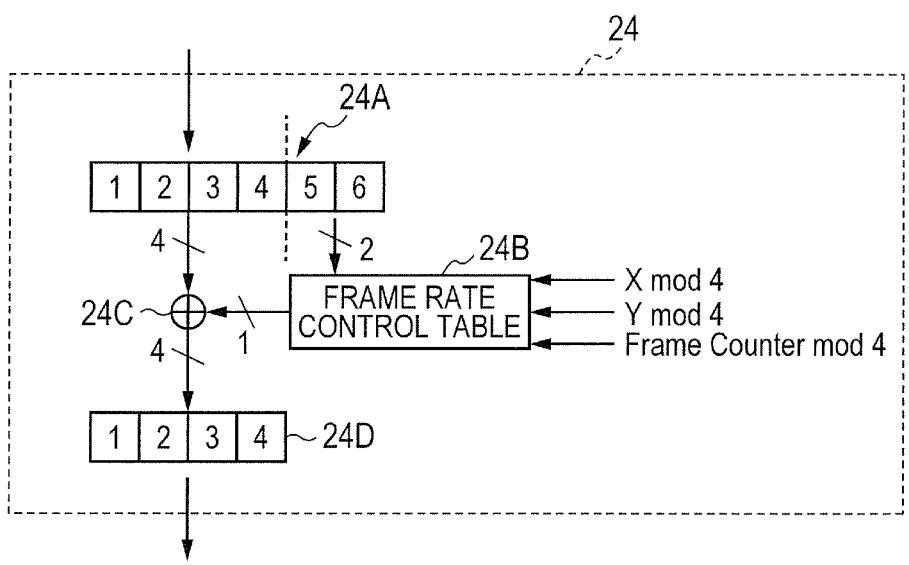
FIG. 11 is a diagram showing the operation and structure of a frame rate control section in FIGS. 7 and 8.

The operation of the frame rate control section 24 will be explained below in more detail. With reference to FIG. 11, the frame rate control section 24 divides an input 6-bit data piece into a set of higher 4 bits and a set of lower 2 bits at a stage 24A. The frame rate control section 24 includes a frame rate control table 24B having the contents shown in FIG. 12. A to-be-accessed position within the frame rate control table 24B is decided by a value of 8 bits being lower 2 bits in the input 6-bit data piece, 4 bits representing the position of the target pixel relative to a block of 4-by-4 neighboring pixels, and lower 2 bits in frame counter data. The 4 position-representing bits are lower 2 bits in an X-coordinate portion of coordinate data and lower 2 bits in a Y-coordinate portion thereof. Then, a held value of "0" or "1" is read out from the decided position in the frame rate control table 24B. At a stage 24C, the read-out value is added to the value of higher 4 bits separated from the input 6-bit data piece. A set of the addition-result 4 bits is labeled as a 4-bit data piece 24D to be outputted from the frame rate control section 24. Subsequently, the 4-bit data piece 24D is actually outputted from the frame rate control section 24.

In FIG. 7, every M-bit data piece is inputted into a limiter section 25 from the frame rate control section 24. The limiter section 25 limits the greatest value of the drive gradation represented by the input M-bit data piece to a maximum value of "12". The resultant M-bit data piece is outputted from the limiter section 25. When M=4, the resultant M-bit data piece indicates one among gradations of "0" to "12" which is assigned to the target pixel.

With reference back to FIG. 8, every 4-bit data piece is inputted into a subframe data generating section 26 from the limiter section 25 (see FIG. 7). The subframe data generating section 26 converts the input 4-bit data piece into a 12-bit data piece (a 12-bit pixel data piece) to be transferred to a corresponding pixel in the reflective liquid-crystal display device 6 (see FIG. 7). The subframe data generating section 26 uses drive gradation tables 27 for the data piece conversion. The subframe data generating section 26 outputs the 12-bit data piece.

In FIG. 7, every 12-bit data piece is inputted into a memory control section 28 from the subframe data generating section 26. The memory control section 28 stores the input 12-bit data piece into a frame buffer 29 divided into portions corresponding to subframes respectively. The frame buffer 29 has a double buffer structure including first and second buffers (a buffer "0" and a buffer "1"). For a frame represented by the decoded video signal fed to the drive circuit 102, 12-bit data pieces which have been obtained for the immediately preceding frame are transferred from the first buffer (the buffer "0") to the reflective liquid-crystal display device 6 via the memory control section 28 and a data transfer section 30 while 12-bit data pieces from the subframe data generating section 26 are sequentially stored into the second buffer (the buffer "1") via the memory control section 28. For the next frame, 12-bit data pieces which have been obtained for the immediately preceding frame are transferred from the first buffer to the reflective liquid-crystal display device 6 via the memory control section 28 and the data transfer section 30 while 12-bit data pieces from the subframe data generating section 26 are sequentially stored into the first buffer.

In the drive circuit 102 of FIG. 7, a drive control section 31 controls timings of subframe-by-subframe processing, and repetitively gives the data transfer section 30 a command to transfer data pieces while controlling a gate driver 34. The data transfer section 30 instructs the memory control section 28 in accordance with the command from the drive control section 31, and thereby receives 12-bit data pieces for a designated subframe from the frame buffer 29 via the memory control section 28 and transfers the received 12-bit data pieces to a source driver 33. Each time the source driver 33 has received 12-bit data pieces for one line from the data transfer section 30, the source driver 33 simultaneously transfers the received 12-bit data pieces to corresponding pixel circuits 7 of the reflective liquid-crystal display device 6 via column data lines D0-Dn. At this time, the gate driver 34 makes active a row selection line Wy designated by a vertical start signal VST and a vertical shift clock signal VCK fed from the drive control section 31. Thus, the 12-bit data pieces are sampled and held by pixel circuits 7 for the designated row "y", respectively.

As shown in FIG. 7, the drive circuit 102 includes a voltage control section 32 supplied with the saturation voltage Vw and the zero voltage (the ground potential GND). The voltage control section 32 sets the voltages at the blanking voltage line V0, the drive voltage line V1, and the common electrode 10 to the saturation voltage Vw and the zero voltage while being controlled by the drive control section 31.

Figure 13:
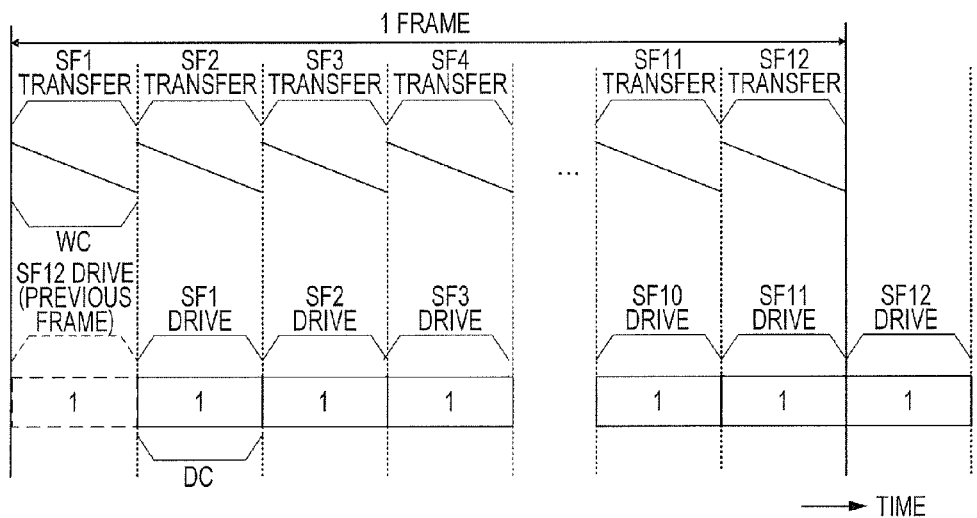
FIG. 13 is a time-domain diagram showing a pattern of drive of the reflective liquid-crystal display device in FIGS. 5 and 7.

With reference to FIG. 13, the decoded video data fed to the drive circuit 102 sequentially represents 120 frames per second. Every frame is divided into 12 subframes. In FIG. 13, WC denotes a period of time during which data pieces for one subframe are transferred to the pixel circuits 7 of the reflective liquid-crystal display device 6 respectively, and DC denotes a period of time during which the liquid crystal in the pixels of the display device 6 is activated for one subframe. Each of the WC period and the DC period is set to 694 μs. One frame has a sequence of 12 WC periods which correspond to subframes respectively. One frame has a sequence of 12 DC periods also which correspond to subframes respectively. The 12 WC periods are offset or advanced relative to the 12 DC periods by one WC period (one DC period). Data pieces assigned to the 12 subframes are transferred in the order "SF1, SF2, . . . , SF11, and SF12" for the WC periods. The liquid crystal in the pixels of the display device 6 is driven in the order "SF1, SF2, . . . , SF11, and SF12" for the DC periods in such a manner as to be delayed from the data piece transfer by one WC period (one DC period). When a data piece sampled and held by a pixel circuit 7 is "0", a related pixel is in a blanking state. On the other hand, when the data piece is "1", the related pixel is in an activated state.

The drive gradation tables 27 in FIG. 7 are, for example, drive gradation tables A and B in FIG. 14. The drive gradation tables A and B are designed for settings where the decoded video data fed to the drive circuit 102 sequentially represents 120 frames per second, and every frame is divided into 12 subframes defined by equal-width step bit pulses respectively. Each of a data transfer period (a WC period) and a drive period (a DC period) is equal to 694 μs. Each of the drive gradation tables A and B indicates a prescribed relation between the gradation represented by a data piece (a 4-bit data piece outputted from the limiter section 25) and the state of the data piece for each of DC periods corresponding to subframes respectively. In each of the drive gradation tables A and B, the cells in the leftmost column are assigned to different gradations which can be represented by a 4-bit data piece outputted from the limiter section 25, and SF1-SF12 denote order numbers assigned to respective subframes in one frame. A table cell for a DC period which indicates "1" means that a related pixel is in its activated state. On the other hand, a table cell for a DC period which indicates "0" means that a related pixel is in its blanking state.

According to the drive gradation table A in FIG. 14, when the gradation is "0" (black), the related pixel is in its blanking state for all the DC periods (the subframes) SF1-SF12. When the gradation is "1", the related pixel is in its activated state for only the mid DC period SF6. When the gradation is "2", the related pixel is in its activated state for only the DC periods SF6 and SF7. When the gradation is "3", the related pixel is in its activated state for only the DC periods SF5, SF6, and SF7. As the gradation increases, the number of DC periods for which the related pixel is in its activated state increases. When the gradation is "12" (the maximum value), the related pixel is in its activated state for all the DC periods SF1-SF12. Specifically, when the gradation increases from an odd number to the next even number, a DC period following the pixel-activated-state DC periods is added as one for which the related pixel is in its activated state. Thus, in this case, the number of pixel-activated-state DC periods increases in a manner such that the total pixel-activated-state time interval is extended in the temporally normal direction. When the gradation increases from an even number to the next odd number, a DC period preceding the pixel-activated-state DC periods is added as one for which the related pixel is in its activated state. Thus, in this case, the number of pixel-activated-state DC periods increases in a manner such that the total pixel-activated-state time interval is extended in the temporally reverse direction.

According to the drive gradation table B in FIG. 14, when the gradation is "0" (black), the related pixel is in its blanking state for all the DC periods SF1-SF12. When the gradation is "1", the related pixel is in its activated state for only the mid DC period SF7. When the gradation is "2", the related pixel is in its activated state for only the DC periods SF6 and SF7. When the gradation is "3", the related pixel is in its activated state for only the DC periods SF6, SF7, and SF8. As the gradation increases, the number of DC periods for which the related pixel is in its activated state increases. When the gradation is "12" (the maximum value), the related pixel is in its activated state for all the DC periods SF1-SF12. Specifically, when the gradation increases from an odd number to the next even number, a DC period preceding the pixel-activated-state DC periods is added as one for which the related pixel is in its activated state. Thus, in this case, the number of pixel-activated-state DC periods increases in a manner such that the total pixel-activated-state time interval is extended in the temporally reverse direction. When the gradation increases from an even number to the next odd number, a DC period following the pixel-activated-state DC periods is added as one for which the related pixel is in its activated state. Thus, in this case, the number of pixel-activated-state DC periods increases in a manner such that the total pixel-activated-state time interval is extended in the temporally normal direction.

The subframe data generating section 26 in FIGS. 7 and 8 converts every input 4-bit data piece into a 12-bit data piece according to the drive gradation tables A and B. For example, when the input 4-bit data piece represents a gradation of "4" and the drive gradation table A is used, the subframe data generating section 26 converts the input 4-bit data piece into a 12-bit sequence of "000011110000". When the input 4-bit data piece represents a gradation of "5" and the drive gradation table B is used, the subframe data generating section 26 converts the input 4-bit data piece into a 12-bit sequence of "000011111000". The 12 bits of the conversion-result data piece are assigned to the subframes in one frame, respectively. The subframe data generating section 26 outputs the conversion-result 12-bit data piece as a generated subframe data piece.

As shown in FIG. 15, the drive gradation table A is used for a pair of a first right-eye frame R1 and a first left-eye frame L1 (first frames represented by the right-eye and left-eye signals) represented by the decoded video signal. The drive gradation table B is used for a pair of second right-eye and left-eye frames R2 and L2. The drive gradation table A is used for a pair of third right-eye and left-eye frames R3 and L3. The drive gradation table B is used for a pair of fourth right-eye and left-eye frames R4 and L4. Thus, the drive gradation tables A and B are used in the order "AABB" for the frame sequence "L1, R1, L2, R2". The drive gradation tables A and B are alternately used for pairs of right-eye and left-eye frames.

Figure 16:
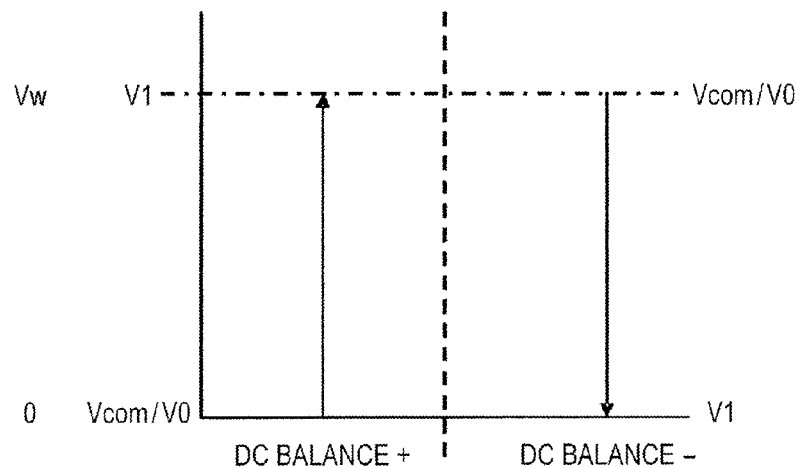
FIG. 16 is a diagram of conditions of polarity inversion which occurs during the drive of the reflective liquid-crystal display device in FIGS. 5 and 7.
Figure 17:
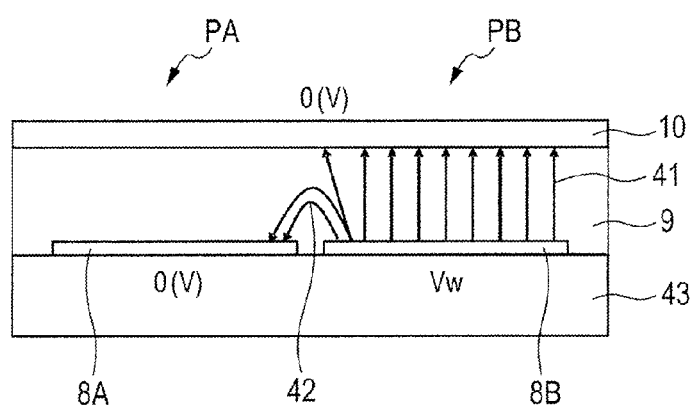
FIG. 17 is a sectional diagram showing two neighboring pixels of the reflective liquid-crystal display device in FIGS. 5 and 7 and electric fields arising in given conditions.

In the case where the reflective liquid-crystal display device 6 is subjected to digital drive, neighboring pixels are frequently in different states respectively. When a DC balance is positive (+), V0=Vcom=0 (V) and V1=Vw as shown in FIG. 16, where V0, V1, Vcom, and Vw denote the voltage at the blanking voltage line, the voltage at the drive voltage line, the voltage at the common electrode 10, and the saturation voltage respectively. When the DC balance is negative (−), V0=Vcom=Vw and V1=0 (V) as shown in FIG. 16. With reference to FIG. 17, in the case where the gradation for a pixel PA is "5" and the gradation for a pixel PB neighboring the pixel PA is "6" and the drive gradation table A of FIG. 14 is used while the DC balance is positive and the common electrode 10 is subjected to 0 (V), the pixels PA and PB are in different states at a timing of the subframe SF9. Specifically, at this timing, the pixel PA is in its blanking state and its pixel electrode 8A is subjected to the voltage 0 (V) while the pixel PB is in its activated state and its pixel electrode 8B is subjected to the saturation voltage Vw. Accordingly, there is a voltage difference between the pixel electrode 8B and the common electrode 10 so that a longitudinal electric field 41 extending from the pixel electrode 8B to the common electrode 10 occurs and the liquid crystal 9 therebetween is rotated by a given angle. At this timing, there is also a voltage difference between the pixel electrode 8B and the pixel electrode 8A so that an electric field 42 extending from the pixel electrode 8B to the pixel electrode 8A occurs along a transverse (lateral) or sideways direction. The transverse (lateral) electric field 42 causes an unintentional disturbance in motion of the liquid crystal in the two pixels which would deteriorate indicated images.

Figures 18, 19:
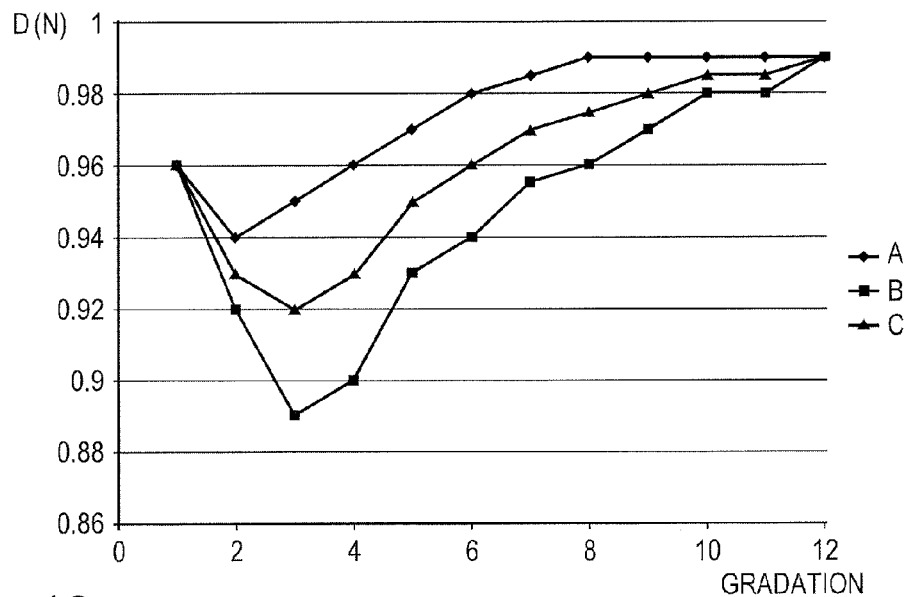
FIG. 18 is a diagram showing the results of measurement on the degree of a deterioration of indicated images which is caused by transverse electric fields for each of different drive gradation tables.
FIG. 19 is a diagram of drive gradation tables for comparison purposes.

FIG. 18 shows the results of measurement on the degree of a deterioration of indicated images which is caused by transverse electric fields for each of different drive gradation tables. The characters L(N) denote the luminance measured when the whole of a frame has a gradation of N. The characters L(N+1) denote the luminance measured when the whole of a frame has a gradation of "N+1". The characters C(N, N+1) denote the luminance measured when pixels having a gradation of "N" and pixels having a gradation of "N+1" are alternately arranged in a matrix for a frame. A performance index D(N) is calculated from the measured luminances L(N), L(N+1), and C(N, N+1) according to the following equation.

$$D(N) = \frac{2 \times C(N, N+1)}{L(N) + L(N+1)}$$

For each of three different drive gradation tables, the performance index D(N) was repetitively calculated while the gradation was increased stepwise from "1" to "12". In FIG. 18, the calculated performance indexes D(N) for the respective gradations are plotted where the calculated performance indexes are assigned to the ordinate while the gradations are assigned to the abscissa.

In the absence of transverse electric fields between neighboring pixels, the luminance L(N)+L(N+1) and the luminance 2×C(N, N+1) are equal so that the performance index D(N) is 1. On the other hand, in the presence of transverse electric fields, electric-field disturbances occur between the pixels so that motion of the liquid crystal is disordered and the luminances actually provided by the pixels are varied from the desired values. As a result of these luminance variations, the luminance 2×C(N, N+1) differs from the luminance L(N)+L(N+1), and the performance index D(N) decreases from 1. In the case of liquid crystal of vertical alignment, a pixel free from a voltage is in its black state and hence a luminance variation by a transverse electric field is a luminance reduction.

FIG. 19 shows drive gradation tables C and D which were prepared and used for comparison purposes. With reference to FIG. 18, a polygonal chain A connects the points indicative of the measured luminances which were obtained when the drive gradation table C in FIG. 19 was used. A polygonal chain B connects the points indicative of the measured luminances which were obtained when the drive gradation table D in FIG. 19 was used. A polygonal chain C connects the points indicative of the measured luminances which were obtained when the drive gradation table A or B in FIG. 14 was used.

According to the drive gradation table C in FIG. 19, when the gradation is "0" (black), the related pixel is in its blanking state for all the DC periods SF1-SF12. When the gradation is "1", the related pixel is in its activated state for only the first DC period SF1. As the gradation increases, the number of DC periods for which the related pixel is in its activated state increases. Specifically, when the gradation increases by "1", a DC period following the pixel-activated-state DC period or periods is added as one for which the related pixel is in its activated state. Thus, in this case, the number of pixel-activated-state DC periods increases in a manner such that the total pixel-activated-state time interval is extended in the temporally normal direction.

According to the drive gradation table D in FIG. 19, when the gradation is "0" (black), the related pixel is in its blanking state for all the DC periods SF1-SF12. When the gradation is "1", the related pixel is in its activated state for only the last DC period SF12. As the gradation increases, the number of DC periods for which the related pixel is in its activated state increases. Specifically, when the gradation increases by "1", a DC period preceding the pixel-activated-state DC period or periods is added as one for which the related pixel is in its activated state. Thus, in this case, the number of pixel-activated-state DC periods increases in a manner such that the total pixel-activated-state time interval is extended in the temporally reverse direction.

As understood from FIG. 18, the measured luminances on the polygonal chain A were less affected by transverse electric fields than those on the polygonal chains B and C were. The measured luminances on the polygonal chain B were more affected by transverse electric fields than those on the polygonal chains A and C were. The measured luminances on the polygonal chain C were intermediate between those on the polygonal chain A and those on the polygonal chain B.

FIG. 20 shows a pair of right-eye and left-eye images projected onto the screen 13 by the display apparatus 100. The left-eye image has a circular area with a gradation of "H" and a background area with a gradation of "L" which surrounds the circular area. The circular area is divided into an area A1 and an area A3L. A gradation of "H" is higher than a gradation of "L". The right-eye image has a circular area with a gradation of "H" and a background area with a gradation of "L" which surrounds the circular area. The circular area is divided into the area A1 and an area A3R. The right-eye and left-eye images overlap in the area A1. The areas A3R and A3L are out of overlap. A combination of the areas A1, A3R, and A3L is surrounded by an area A2.

With reference to FIG. 21, the gradation in the area A1 continues to be "H" regardless of whether the currently indicated image is a right-eye image or a left-eye image. The gradation in the area A2 continues to be "L" regardless of whether the currently indicated image is a right-eye image or a left-eye image. The gradation of each of the areas A3R and A3L alternates between "L" and "H" while the indicated image periodically changes between a right-eye image and a left-eye image.

FIG. 22 shows a view of the right-eye and left-eye images in FIG. 20 which is obtained through only the left-eye portion of the liquid-crystal shutter glasses 105. During the current frame interval for which the left-eye image is indicated, the viewer perceives that an area B1 composed of the areas A1 and A3L has a gradation of "H" and the area A2 has a gradation of L. The area A3R should be perceived to be "L" in gradation. During the immediately preceding frame interval for which the right-eye image is indicated, the area A3R has a gradation of H. Accordingly, in some cases, the area A3R is indicated as an area with a gradation higher than L. In these cases, the gradation of the area A3R is closer to "H" assigned to the right-eye image so that the viewer feels crosstalk between the right-eye image and the left-eye image.

Generally, the response speed of liquid crystal subjected to an intermediate drive voltage (a drive voltage corresponding to an intermediate gradation) is lower than that of liquid crystal subjected to a high drive voltage. Thus, when liquid crystal is subjected to an intermediate drive voltage, the current frame tends to considerably affect the next frame. In the case where an indicated area is assigned a gradation of "L" for the current frame and a gradation of "H" for the immediately preceding frame, the actually observed gradation of the indicated area in the current frame is higher than "L" since the gradation of the indicated image is assigned "H" for the immediately preceding frame. In this case, the viewer feels crosstalk between the right-eye image and the left-eye image.

Figure 23:
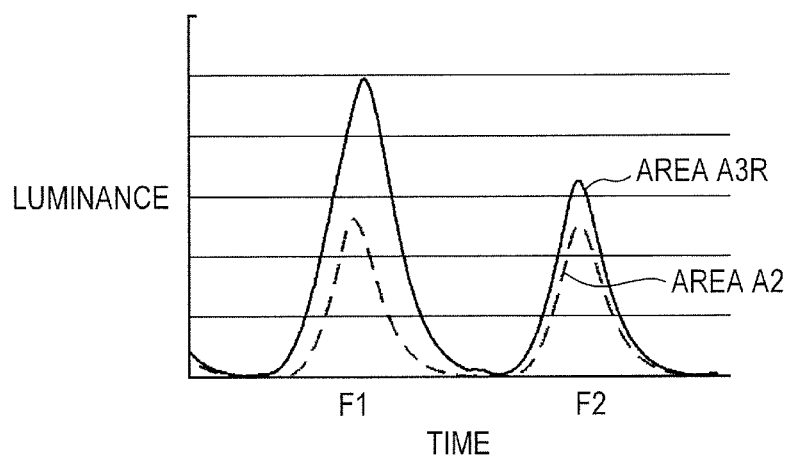
FIG. 23 is a time-domain diagram of luminances at two of the areas in FIGS. 20 and 22 which show response characteristics of the reflective liquid-crystal display device in FIGS. 5 and 7.

With reference to FIG. 23, a left-eye signal with a gradation of "L" is inputted into the reflective liquid-crystal display device 6 for a frame F2. A right-eye signal with a gradation of "H" is inputted regarding the area A3R and a right-eye signal with a gradation of "L" is inputted regarding the area A2 for a frame F1 immediately preceding the frame F2. The reflective liquid-crystal display device 6 should indicate a gradation of "L" in both the areas A2 and A3R for the frame F2. The influence of the gradation in the immediately preceding frame F1 causes the actual luminances in the areas A2 and A3R for the frame F2 to be different from each other.

Figure 24:
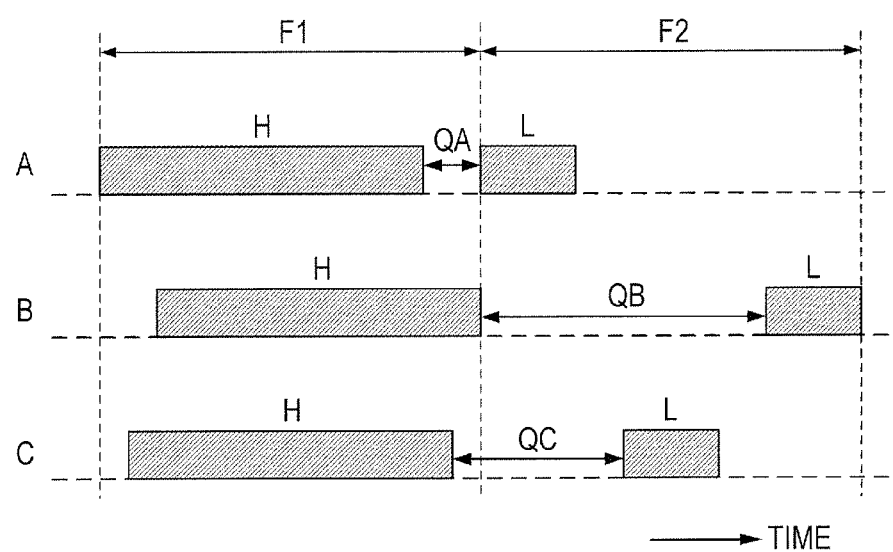
FIG. 24 is a time-domain diagram showing variations in gradation represented by an output video signal from the drive circuit of FIGS. 5 and 7 under given signal conditions which are generated through the use of the drive gradation tables in FIGS. 14 and 19, respectively.

With reference to FIG. 24, a gradation of "L" is assigned to a frame F2, and a gradation of "H" is assigned to a frame F1 immediately preceding the frame F2. For the frames F1 and F2, the portions A, B, and C of FIG. 24 show time-domain variations in gradation represented by an output video signal from the drive circuit 102 which are generated through the use of the drive gradation table C in FIG. 19, the drive gradation table D in FIG. 19, and the drive gradation table A or B in FIG. 14, respectively.

In the portion A of FIG. 24, a long gradation-H time interval in the frame F1 is followed by a short blanking-state time interval QA. Therefore, the luminance in the next frame F2 is raised from the assigned level so that considerable crosstalk between a right-eye image and a left-eye image occurs. In each of the portions B and C of FIG. 24, a long gradation-H time interval in the frame F1 is followed by a long blanking-state time interval QB or QC. Therefore, the next frame F2 is less affected by the frame F1 so that crosstalk between a right-eye image and a left-eye image is suppressed as compared with the case shown in the portion A of FIG. 24.

As understood from the above description, the use of the drive gradation tables A and B of FIG. 14 prevents transverse-direction electric fields occurring between pixels of the reflective liquid-crystal display device 6 from considerably deteriorating indicated images. Furthermore, the use of the drive gradation tables A and B of FIG. 14 reduces crosstalk between right-eye images and left-eye images which is caused by the influence of every frame on the next frame.

Figure 25:
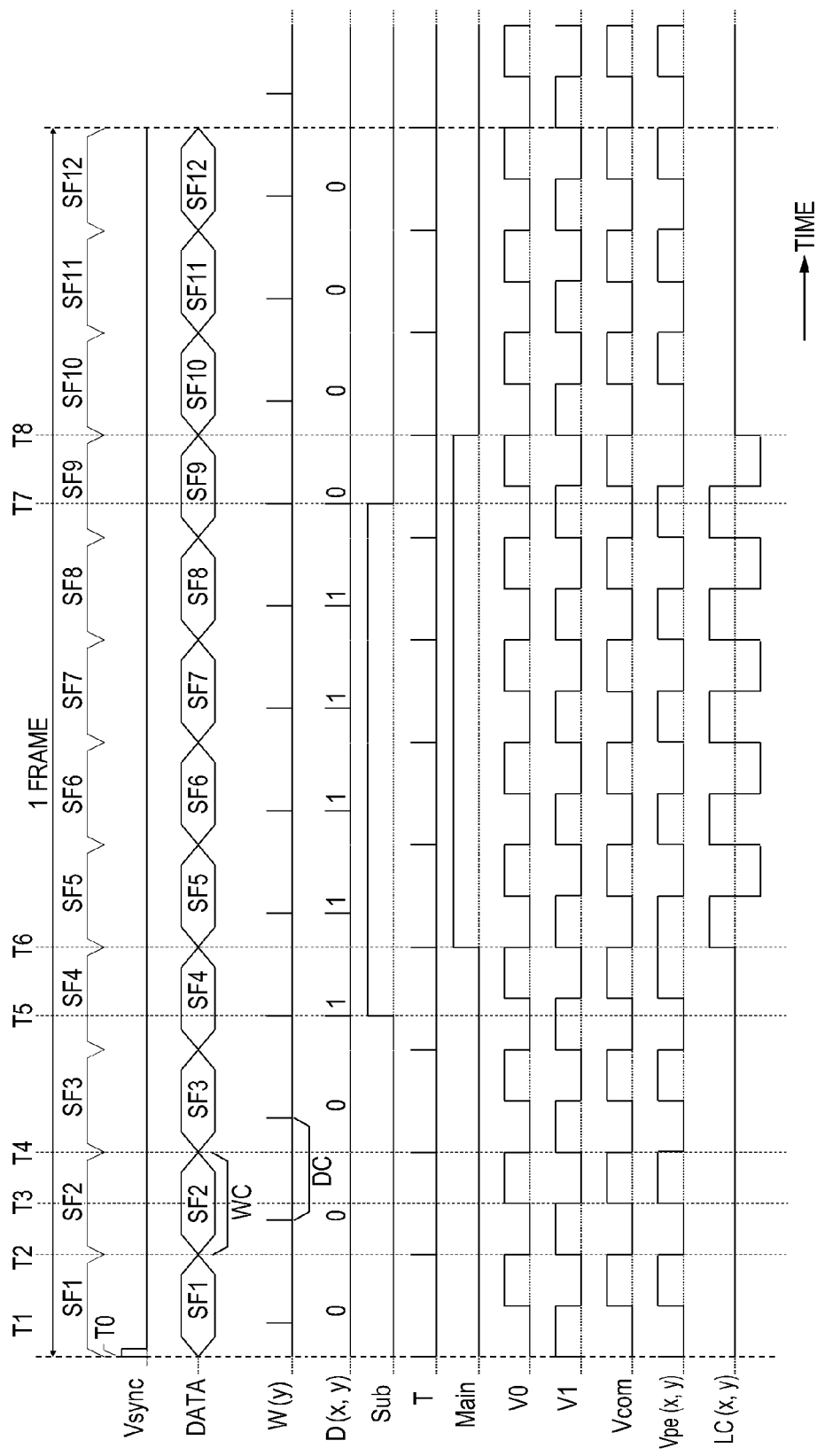
FIG. 25 is a time-domain diagram of the states of various signals in the drive circuit and the reflective liquid-crystal display device of FIG. 7.

With reference to FIG. 25, at a time point T0, a vertical sync signal Vsync becomes active. During a time interval from the time point T0 to a later time point T2, pixel data pieces for the first subframe SF1 are transferred to the pixel circuits 7 of the reflective liquid-crystal display device 6. Thus, the time interval between the time points T0 and T2 is a WC period (see FIG. 13). At a time point T1 between the time points T0 and T2, a data piece for a pixel (x, y) is sampled and held by a sub sample hold section 18 (see FIG. 3).

At the time point T2, the transfer-purpose signal T changes to a high-level state so that the pixel data piece is transferred from each of the sub sample hold sections 18 for the respective pixels to a related main sample hold section 16 via a related switch section 19. During a time interval from the time point T2 to a later time point T4, the liquid crystal in the pixels of the display device 6 is driven in accordance with the pixel data pieces for the subframe SF1 which are outputted from the main sample hold sections 16. Thus, the time interval between the time points T2 and T4 is a DC period (see FIG. 13). During the time interval between the time points T2 and T4, pixel data pieces for the first subframe SF2 are transferred to the pixel circuits 7 of the reflective liquid-crystal display device 6. Thus, the time interval between the time points T2 and T4 is a WC period (see FIG. 13) also.

There is a time point T3 intermediate between the time points T2 and T4. During the time interval between the time points T2 and T3, drive with a positive DC balance is carried out. During the time interval between the time points T3 and T4, drive with a negative DC balance is carried out.

FIG. 25 shows conditions where the pixel (x, y) is assigned a gradation of "5" in the drive gradation table A in FIG. 14. Accordingly, the pixel (x, y) is in its blanking state for the subframes SF1-SF3 and SF9-SF12, and is in its activated state for the subframes SF4-SF8. Thus, regarding the pixel (x, y), pixel data pieces D(x, y) being "000111110000" are transferred from the source driver 33 to the sub sample hold section 18 in the related pixel circuit 7 for the subframes SF1-SF12 respectively. After the time point T4, there are successive time points T5-T8. The time points T5-T7 are in the subframes SF4-SF9. During the time interval from the time point T5 and before the time point T7, a pixel data piece D(x, y) in a high-level state which causes the pixel (x, y) to be in its activated state is repetitively sampled and held by the sub sample hold section 18. At the time point T6, the pixel data piece in its high-level state which was sampled and held at the time point T5 is transferred from the sub sample hold section 18 to the related main sample hold section 16 via the related switch section 19, and is sampled and held by the main sample hold section 16. At the time point T7, a pixel data piece D(x, y) in a low-level state which causes the pixel (x, y) to be in its blanking state is sampled and held by the sub sample hold section 18. At a time point T8 after the time point T7, the pixel data piece in its low-level state which was sampled and held at the time point T7 is transferred from the sub sample hold section 18 to the related main sample hold section 16 via the related switch section 19, and is sampled and held by the main sample hold section 16. Thus, during the time interval between the time points T6 and T8, a pixel data piece in a high-level state continues to be held by the main sample hold section 16. The pixel data piece held by the main sample hold section 16 is applied therefrom to the related voltage selection circuit 17. For the blanking state corresponding to a low-level pixel data piece held by the main sample hold section 16, the related voltage selection circuit 17 selects a voltage at the blanking voltage line V0 and applies the selected voltage to the related pixel electrode 8. For the activated state corresponding to a high-level pixel data piece held by the main sample hold section 16, the related voltage selection circuit 17 selects a voltage at the drive voltage line V1 and applies the selected voltage to the related pixel electrode 8. Accordingly, only the time interval between the time points T6 and T8, the liquid crystal LC(x, y) in the pixel (x, y) is subjected via the related voltage selection circuit 17 to a voltage causing the activated state. Thus, the pixel (x, y) is actually provided with a gradation of "5" in the drive gradation table A of FIG. 14.

As understood from FIGS. 13 and 14, the drive of the reflective liquid-crystal display device 6 uses equal-width step bit pulses rather than binary bit pulses. Generally, binary bit pulses have different widths for respective subframes which result from "binary weighting", that is, multiplying the width of a unit pulse by binary weighting factors "2n" (n=0, 1, 2, 3 . . . ). Thus, the binary bit pulses have widths such as "1", "2", "4", "8", "16", . . . for the respective subframes. On the other hand, step bit pulses have equal widths such as "32", "32", "32", "32", "32", . . . for the respective subframes. The use of step bit pulses reduces a risk of causing a false contour in an indicated moving image as compared with the use of binary bit pulses.

Typically, a false contour arises under the following conditions. Binary bit pulses are used, and two neighboring pixels are assigned similar gradations. In the case where many of binary bit pulses applied to one pixel are in activated states and many of binary bit pulses applied to the other pixel are in blanking states, an unintentional luminance is perceived by the viewer when viewer's eyes are moved or a close-up human face in an indicated moving picture moves. The perceived unintentional luminance is a false contour. The use of equal-width step bit pulses prevents a luminance from remarkably varying when viewer's eyes are moved. Therefore, provided that equal-width step bit pulses are used, a false contour is hardly sensed by the viewer.

The section 24 in FIGS. 7, 8, and 11 implements the frame rate control (FRC) which reduces the influence of transverse electric fields by uniformly dispersing them among frames. As shown in FIG. 12, the frame rate control table 24B in the section 24 is divided into 16 subtables corresponding to respective blocks each of 4-by-4 pixels.

Figures 26, 27:
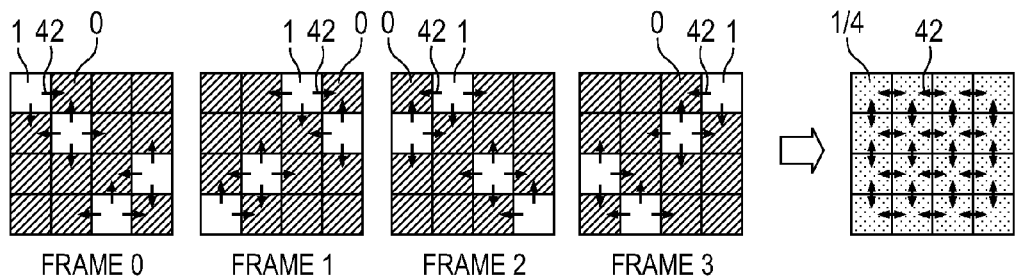
FIG. 26 is a diagram showing the gradation state of a block of 4 by 4 pixels and transverse-direction electric fields in each of 4 successive frames, and the superimposition of the transverse-direction electric fields over the 4 successive frames.
FIG. 27 is a diagram of drive gradation tables in a second embodiment of this invention.

With reference to FIG. 26, the lower F bits in an (M+F)-bit data piece inputted into the frame rate control section 24 are "01". Four subtables are used for four successive frames "1", "2", "3", and "4" respectively. In each frame, when there are neighboring pixels different in states, transverse electric fields 42 arise along directions from the pixels in the activated state ("1") toward the pixels in the blanking state ("0"). The rightmost portion of FIG. 26 shows the conditions resulting from superimposing the transverse electric fields 42 arising in the four successive frames. As understood from the rightmost portion of FIG. 26, all the transverse electric fields 42 cancel each other in the sense of averaging the four successive frames.

Thus, the frame rate control by the section 24 uniformly disperses or cancels the transverse electric fields 42 in the sense of averaging the four successive frames. Accordingly, the frame rate control by the section 24 reduces the transverse electric fields 42 causing a deterioration of an indicated image. The measurement on the degree of an indicated image deterioration caused by transverse electric fields regarding FIG. 18 was carried out in the presence of the frame rate control.

Second Embodiment

A second embodiment of this invention is similar to the first embodiment thereof except for the structure of one of drive gradation tables. The second embodiment of this invention uses drive gradation tables E and F of FIG. 27 instead of the drive gradation tables A and B in FIG. 14, respectively.

The drive gradation table E is completely the same as the drive gradation table A. For gradations of "0" to "8", the drive gradation table F is the same as the drive gradation table B. For gradations of "9" to "12", the drive gradation table F differs from the drive gradation table B as follows. According to the drive gradation table F for gradations of "9" to "12", when the gradation increases from an odd number to the next even number, a DC period following the pixel-activated-state DC periods is added as one for which the related pixel is in its activated state. Thus, in this case, the number of pixel-activated-state DC periods increases in a manner such that the total pixel-activated-state time interval is extended in the temporally normal direction. When the gradation increases from an even number to the next odd number, a DC period preceding the pixel-activated-state DC periods is added as one for which the related pixel is in its activated state. Thus, in this case, the number of pixel-activated-state DC periods increases in a manner such that the total pixel-activated-state time interval is extended in the temporally reverse direction.

Generally, in the range of high gradations, flicker is liable to be perceived in a stream of indicated images. For high gradations (gradations of "9" to "12"), the drive gradation tables E and F are the same in temporal direction along which the pixel-activated-state time interval is extended in response to a gradation increment of "1". This design reduces flicker in a stream of indicated images.

FIG. 18 shows that the degree of influence of transverse electric fields is relatively low for high gradations (gradations of "9" to "12"). Therefore, the above design for reducing flicker hardly affects the quality of indicated images.

For gradations of "1" to "8", the drive gradation tables E and F are different. For gradations of "9" to "12", the drive gradation tables E and F are the same. Thus, for gradations of "1" to "8", different drive gradation tables are alternately used. On the other hand, for gradations of "9" to "12", a same drive gradation table is iteratively used.

The drive gradation tables E and F may be modified as follows. According to a first example, for gradations of "1" to "7", the drive gradation tables E and F are different. For gradations of "8" to "12", the drive gradation tables E and F are the same. According to a second example, for gradations of "1" to "9", the drive gradation tables E and F are different. For gradations of "10" to "12", the drive gradation tables E and F are the same. According to a third example, for gradations of "1" to "R−1", the drive gradation tables E and F are different, where R denotes a prescribed natural number different from 8, 9, and 10. For gradations of "R" to "12", the drive gradation tables E and F are the same.

Third Embodiment

A third embodiment of this invention is a modification of the first or second embodiment thereof. The third embodiment is designed to be capable of indicating a 2D (two dimensional) video signal or indicating a video signal selectable from a 3D video signal and a 2D video signal.

Fourth Embodiment

A fourth embodiment of this invention is similar to the first or second embodiment thereof except for the following design change. In the fourth embodiment, at least one of the values N, M, D, and F differs from that in the first or second embodiment. Preferably, the value N is the range of 8 to 12, and the value M is in the rage of 4 to 6. Preferably, the value D is in the range of 4 to 8, and the value F is 2 or 3.

What is claimed is:

1. A video display apparatus comprising:
a subframe data generating circuit configured to convert every frame regarding an input video signal into a sequence of subframes defined by step bit pulses respectively according to a first drive gradation table and a second drive gradation table, and thereby generate subframe data from the input video signal while alternately using the first drive gradation table and the second drive gradation table;
wherein the first drive gradation table is designed so that a subframe for a mid drive period in the sequence is assigned a pixel activated state when a drive gradation related to the input video signal is 1, a number of subframes assigned the pixel activated state increases each time the drive gradation increases by 1, a subframe newly assigned the pixel activated state is a subframe following the subframe or subframes which have already been assigned the pixel activated state when the drive gradation increases from an odd number to a next even number, and a subframe newly assigned the pixel activated state is a subframe preceding the subframes which have already been assigned the pixel activated state when the drive gradation increases from an even number to a next odd number equal to or greater than 3;
wherein the second drive gradation table is designed so that a subframe for a mid drive period in the sequence is assigned the pixel activated state when the drive gradation is 1, a number of subframes assigned the pixel activated state increases each time the drive gradation increases by 1, a subframe newly assigned the pixel activated state is a subframe preceding the subframe or subframes which have already been assigned the pixel activated state when the drive gradation increases from an odd number to a next even number, and a subframe newly assigned the pixel activated state is a subframe following the subframes which have already been assigned the pixel activated state when the drive gradation increases from an even number to a next odd number equal to or greater than 3;

a liquid-crystal display device; and a drive circuit configured to drive the liquid-crystal display device in response to the subframe data generated by the subframe data generating circuit.

2. A video display apparatus as recited in claim 1, wherein the input video signal is a 3D video signal, and further comprising a signal processing circuit configured to convert the 3D video signal into a conversion-result video signal in which signals for viewer's right eye and signals for viewer's left eye are alternately arranged, wherein the subframes are defined regarding the conversion-result video signal by the step bit pulses respectively.

3. A video display apparatus as recited in claim 1, wherein the subframe data generating circuit alternately uses the first drive gradation table and the second drive gradation table in response to updating of the frame regarding to the input video signal.

4. A video display apparatus as recited in claim 2, wherein the right-eye signals and the left-eye signals in the conversion-result video signal are in pairs each having temporally-adjacent right-eye and left-eye signals, and the subframe data generating circuit uses the first drive gradation table for alternate ones of the pairs and uses the second drive gradation table for the other alternate ones of the pairs.

5. A video display apparatus as recited in claim 1, wherein the subframe data generating circuit alternately uses the first drive gradation table and the second drive gradation table when the drive gradation is a range from a prescribed low value to a prescribed intermediate value, and uses only one of the first drive gradation table and the second drive gradation table when the drive gradation is greater than the prescribed intermediate value.

6. A video display apparatus as recited in claim 1, further comprising:
- a lookup table circuit configured to convert every N-bit data piece of the input video signal into an (M+F+D)-bit data piece through inverse gamma correction and linear interpolation;
- an error diffusing circuit configured to convert the (M+F+D)-bit data piece into (M+F)-bit data piece through error diffusion; and
- a frame rate control circuit configured to convert the (M+F)-bit data piece into an M-bit data piece through frame rate control, and feed the M-bit data piece to the subframe data generating circuit;
- wherein N, M, F, and D denote predetermined natural numbers respectively, and (M+F+D) is greater than N.

7. A video display apparatus comprising:
first means for converting every frame regarding an input video signal into a sequence of subframes defined by step bit pulses respectively according to a first drive gradation table and a second drive gradation table, and thereby generating subframe data from the input video signal while alternately using the first drive gradation table and the second drive gradation table;

wherein the first drive gradation table is designed so that a subframe for a mid drive period in the sequence is assigned a pixel activated state when a drive gradation related to the input video signal is 1, a number of subframes assigned the pixel activated state increases each time the drive gradation increases by 1, a subframe newly assigned the pixel activated state is a subframe following the subframe or subframes which have already been assigned the pixel activated state when the drive gradation increases from an odd number to a next even number, and a subframe newly assigned the pixel activated state is a subframe preceding the subframes which have already been assigned the pixel activated state when the drive gradation increases from an even number to a next odd number equal to or greater than 3;

wherein the second drive gradation table is designed so that a subframe for a mid drive period in the sequence is assigned the pixel activated state when the drive gradation is 1, a number of subframes assigned the pixel activated state increases each time the drive gradation increases by 1, a subframe newly assigned the pixel activated state is a subframe preceding the subframe or subframes which have already been assigned the pixel activated state when the drive gradation increases from an odd number to a next even number, and a subframe newly assigned the pixel activated state is a subframe following the subframes which have already been assigned the pixel activated state when the drive gradation increases from an even number to a next odd number equal to or greater than 3;

a liquid-crystal display device; and second means for driving the liquid-crystal display device in response to the subframe data generated by the first means.

* * * * *